United States Patent

Moyer et al.

(10) Patent No.: US 9,158,725 B2
(45) Date of Patent: Oct. 13, 2015

(54) FLEXIBLE CONTROL MECHANISM FOR STORE GATHERING IN A WRITE BUFFER

(71) Applicants: William C. Moyer, Dripping Springs, TX (US); Quyen Pho, Pflugerville, TX (US)

(72) Inventors: William C. Moyer, Dripping Springs, TX (US); Quyen Pho, Pflugerville, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 457 days.

(21) Appl. No.: 13/682,367

(22) Filed: Nov. 20, 2012

(65) Prior Publication Data

US 2014/0143471 A1  May 22, 2014

(51) Int. Cl.
*G06F 13/40* (2006.01)
*G06F 12/04* (2006.01)
*G06F 9/38* (2006.01)
*G06F 9/30* (2006.01)

(52) U.S. Cl.
CPC ............ *G06F 13/4059* (2013.01); *G06F 12/04* (2013.01); *G06F 9/30043* (2013.01); *G06F 9/3824* (2013.01); *Y02B 60/1225* (2013.01)

(58) Field of Classification Search
CPC  G06F 9/3824; G06F 9/30043; G06F 13/4059
See application file for complete search history.

(56) References Cited

U.S. PATENT DOCUMENTS

| | | | |
|---|---|---|---|
| 5,471,598 A | 11/1995 | Quattromani et al. | |
| 5,615,402 A | 3/1997 | Quattromani et al. | |
| 5,740,398 A | 4/1998 | Quattromani et al. | |
| 5,907,860 A | 5/1999 | Garibay, Jr. et al. | |
| 6,219,773 B1 | 4/2001 | Garibay, Jr. et al. | |
| 6,370,622 B1* | 4/2002 | Chiou et al. | 711/146 |
| 7,366,851 B2* | 4/2008 | Bell et al. | 711/154 |
| 7,757,044 B2* | 7/2010 | Cypher et al. | 711/118 |
| 8,131,951 B2 | 3/2012 | Moyer et al. | |
| 8,352,712 B2* | 1/2013 | Bell et al. | 712/225 |
| 2008/0235459 A1 | 9/2008 | Bell et al. | |
| 2009/0138659 A1 | 5/2009 | Lauterbach | |
| 2013/0046933 A1 | 2/2013 | Le et al. | |
| 2014/0095779 A1 | 4/2014 | Forsyth et al. | |
| 2014/0143500 A1 | 5/2014 | Moyer et al. | |

OTHER PUBLICATIONS

U.S. Appl. No. 13/656,073, filed Oct. 19, 2012, entitled "Flexible Control Mechanism for Store Gathering in a Write Buffer".
Non-Final Office Action mailed Jul. 3, 2014 for U.S. Appl. No. 13/656,073, 17 pages.
Non-Final Office Action—U.S. Appl. No. 13/682,350; Jun. 13, 2014; 17 pgs.
Notice of Allowance mailed Nov. 24, 2014 for U.S. Appl. No. 13/656,073, 5 pages.
Notice of Allowance mailed Dec. 9, 2014 for U.S. Appl. No. 13/682,350, 9 pages.

* cited by examiner

*Primary Examiner* — Brian Misiura

(57) ABSTRACT

A store gathering policy is enabled or disabled at a data processing device. A store gathering policy to be implemented by a store buffer can be selected from a plurality of store gathering polices. For example, the plurality of store gathering policies can be constrained or unconstrained. A store gathering policy can be enabled by a user programmable storage location. A specific store gathering policy can be specified by a user programmable storage location. A store gathering policy can be determined based upon an attribute of a store request, such as based upon a destination address.

20 Claims, 14 Drawing Sheets

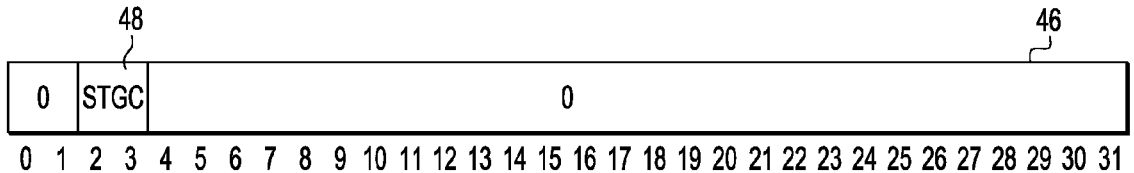

FIG. 3

| TABLE 0-1 CONTROL REGISTER FIELD DESCRIPTIONS | | |
|---|---|---|
| BITS | NAME | DESCRIPTION |
| 0:1 | — | RESERVED |
| 2:3 | STGC | STORE GATHER CONTROL<br>00 - DEFAULT OPERATION - IMPLEMENTATION DEFINED, FOR STORE GATHERING IS DISABLED.<br>01 - STORE GATHERING IS ENABLED. NO CONSTRAINTS ON ALIGNMENT OR REQUIREMENT TO BE CONTIGUOUS. EXTERNAL BUS WRITE ACCESSES FOR GATHERED STORES MAY HAVE NON-CONTIGUOUS BYTE STROBES ASSERTED.<br>10 - STORE GATHERING IS ENABLED. GATHERED STORES ARE REQUIRED TO BE CONTIGUOUS ONCE GATHERED. CACHE HIT DATA FROM A STORE ACCESS LOCKUP MAY BE USED TO PROVIDE ADJACENT STORE DATA TO INCREASE GATHERING OPPORTUNITIES. EXTERNAL BUS WRITE ACCESSES FOR GATHERED STORES WILL NOT HAVE NON-CONTIGUOUS BYTE STROBES ASSERTED.<br>11 - USE ADDRESS RANGE TABLES |
| 4:31 | — | RESERVED |

FIG. 4

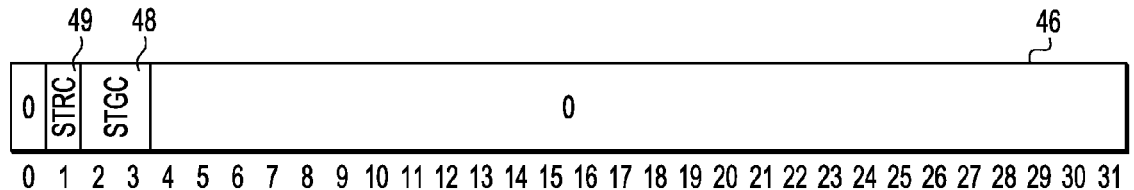

FIG. 9

| TABLE - CONTROL REGISTER FIELD DESCRIPTIONS |||
|---|---|---|
| BITS | NAME | DESCRIPTION |
| 0 | — | RESERVED |
| 1 | STRC | STORE READ CACHE CONTROL<br>0 - DEFAULT OPERATION - CACHE READ FOR NARROW WIDTH STORES FOR STORE GATHERING IS DISABLED.<br>1 - STORE GATHERING IS ENABLED. NO CONSTRAINTS ON ALIGNMENT OR REQUIREMENT TO BE CONTIGUOUS INTERNALLY IF A CACHE HIT OCCURS OR HAS OCCURRED. EXTERNAL BUS WRITE ACCESSES FOR GATHERED STORES ARE PERFORMED AS FULL WIDTH ACCESSES. |
| 2:3 | STGC | STORE GATHER CONTROL<br>00 - DEFAULT OPERATION - IMPLEMENTATION DEFINED. STORE GATHERING IS DISABLED.<br>01 - STORE GATHERING IS ENABLED. NO CONSTRAINTS ON ALIGNMENT OR REQUIREMENT TO BE CONTIGUOUS. EXTERNAL BUS WRITE ACCESSES FOR GATHERED STORES MAY HAVE NON-CONTIGUOUS BYTE STROBES ASSERTED.<br>10 - STORE GATHERING IS ENABLED. GATHERED STORES ARE REQUIRED TO BE CONTIGUOUS ONCE GATHERED. CACHE HIT DATA FROM A STORE ACCESS LOCKUP MAY BE USED TO PROVIDE ADJACENT STORE DATA TO INCREASE GATHERING OPPORTUNITIES IF STRC IS SET. EXTERNAL BUS WRITE ACCESSES FOR GATHERED STORES WILL NOT HAVE NON-CONTIGUOUS BYTE STROBES ASSERTED.<br>11 - USE ADDRESS RANGE TABLES |
| 4:31 | — | RESERVED |

FIG. 10

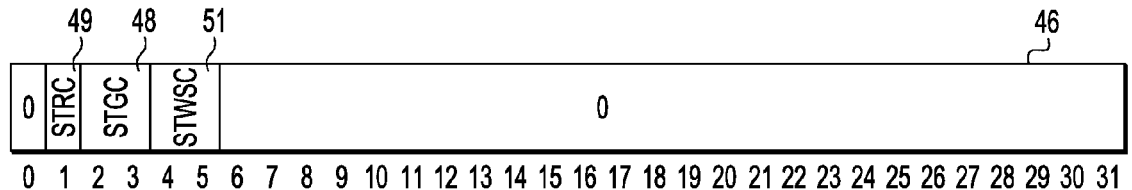

FIG. 14

| TABLE - CONTROL REGISTER FIELD DESCRIPTIONS | | |
|---|---|---|
| BITS | NAME | DESCRIPTION |
| 0 | — | RESERVED |
| 1 | STRC | STORE READ CACHE CONTROL<br>0 - DEFAULT OPERATION - CACHE READ FOR NARROW WIDTH STORES FOR STORE GATHERING IS DISABLED.<br>1 - CACHE READ FOR STORE GATHERING IS ENABLED. NO CONSTRAINTS ON ALIGNMENT OR REQUIREMENT TO BE CONTIGUOUS INTERNALLY IF A CACHE HIT OCCURS OR HAS OCCURRED. EXTERNAL BUS WRITE ACCESSES FOR GATHERED STORES ARE PERFORMED AS OPTIMIZED WIDTH ACCESSES BASED ON THE CONSTRAINTS PROVIDED BY STWSC. |
| 2:3 | STGC | STORE GATHER CONTROL<br>00 - DEFAULT OPERATION - IMPLEMENTATION DEFINED. STORE GATHERING IS DISABLED.<br>01 - STORE GATHERING IS ENABLED. NO CONSTRAINTS ON ALIGNMENT OR REQUIREMENT TO BE CONTIGUOUS. EXTERNAL BUS WRITE ACCESSES FOR GATHERED STORES MAY HAVE NON-CONTIGUOUS BYTE STROBES ASSERTED.<br>10 - STORE GATHERING IS ENABLED. GATHERED STORES ARE REQUIRED TO BE CONTIGUOUS ONCE GATHERED. CACHE HIT DATA FROM A STORE ACCESS LOCKUP MAY BE USED TO PROVIDE ADJACENT STORE DATA TO INCREASE GATHERING OPPORTUNITIES IF STRC IS SET. EXTERNAL BUS WRITE ACCESSES FOR GATHERED STORES WILL NOT HAVE NON-CONTIGUOUS BYTE STROBES ASSERTED.<br>11 - USE ADDRESS RANGE TABLES |

FIG. 15A

| TABLE - CONTROL REGISTER FIELD DESCRIPTIONS |||
|---|---|---|
| BITS | NAME | DESCRIPTION |
| 4:5 | STWSC | STORE GATHER WRITE SIZE CONTROL<br>00 - WRITE SIZE OPTIMIZATION FOR STORE GATHERING IS DISABLED. ALL GATHERED WRITES WILL BE PERFORMED AS DOUBLEWORD TRANSFERS ON THE EXTERNAL INTERFACE WHEN THE STGC FIELD = 10.<br>01 - WRITE SIZE OPTIMIZATION FOR STORE GATHERING IS ENABLED. ALL GATHERED WRITES WILL BE PERFORMED AS MINIMUM SIZE TRANSFERS WITH NO SIZE CONSTRAINTS ON THE EXTERNAL INTERFACE WHEN THE STGC FIELD = 10.<br>10 - WRITE SIZE OPTIMIZATION FOR STORE GATHERING IS PARTIALLY ENABLED. ALL GATHERED WRITES WILL BE PERFORMED AS MINIMUM SIZE TRANSFERS WITH A MINIMUM SIZE CONSTRAINT OF HALFWORD (2 BYTES) ON THE EXTERNAL WHEN THE STGC FIELD = 10.<br>11 - WRITE SIZE OPTIMIZATION FOR STORE GATHERING IS PARTIALLY ENABLED. ALL GATHERED WRITES WILL BE PERFORMED AS MINIMUM SIZE TRANSFERS WITH A MINIMUM SIZE CONSTRAINT OF WORD (4 BYTES) ON THE EXTERNAL WHEN THE STGC FIELD = 10. |
| 6:31 | — | RESERVED |

FIG. 15B

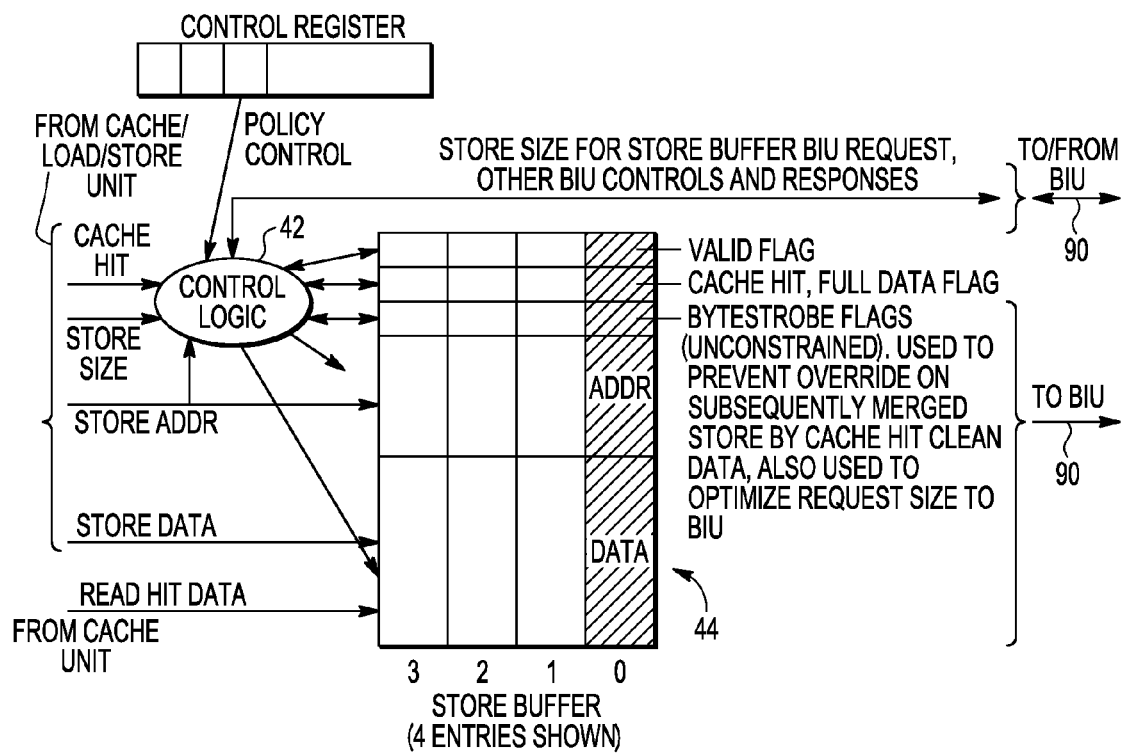

FIG. 16

FLEXIBLE CONTROL MECHANISM FOR STORE GATHERING IN A WRITE BUFFER

FIELD OF THE DISCLOSURE

The present disclosure relates generally to data processing devices, and more particularly to utilization of write or store buffers for data processing devices.

BACKGROUND

In many data processing devices, a store buffer is used to decouple the retirement of store operations to a system bus from a processor or cache of a data processor. The store buffer can contain a number of entries, each of which can store address information, data information, and control information that are to be provided to a bus interface unit during a write operation to memory connected to the system interconnect. In some example embodiments, a cache may be implemented between the store buffer and the processor of the data processing device to facilitate memory accesses by the processor.

BRIEF DESCRIPTION OF THE DRAWINGS

The present disclosure may be better understood, and its numerous features and advantages made apparent to those skilled in the art by referencing the accompanying drawings.

FIG. 3 is a diagram of a control register of FIG. 1 in accordance with one embodiment of the present disclosure.

FIG. 4 is a table showing example descriptions of the control register settings for the control register of FIG. 3 in accordance with one embodiment of the present disclosure.

FIG. 9 is a diagram of the control register of FIG. 1 in accordance with another embodiment of the present disclosure.

FIG. 10 is a table showing example descriptions of the control register settings for the control register of FIG. 9 in accordance with another embodiment of the present disclosure.

FIG. 14 is a diagram of the control register of FIG. 1 in accordance with another embodiment of the present disclosure.

FIGS. 15A and 15B illustrate a table showing example descriptions of the control register settings for the control register of FIG. 14 in accordance with another embodiment of the present disclosure.

FIG. 16 is a block diagram of the store buffer structure of the store buffer of FIG. 1 in accordance with another embodiment of the present disclosure.

DETAILED DESCRIPTION

FIGS. 1-17 illustrate example systems and techniques for determining a store gathering policy for store buffer entries at a data processing device. Each store buffer entry width may typically be the size of the largest store request generated by the central processing unit. Alternatively, the store buffer entry width may be the same width as the external data bus that the store buffer interfaces with to store data information and store requests at an attached memory location. Store buffer entry width may also correspond to both the largest store request and data bus width. Thus, multiple store requests targeting a data location, which are smaller than the store buffer entry width, may be gathered and stored in the same store buffer entry. A user programmable indicator can be used to indicate whether a bus write access to the system data bus is to be the full width of the store buffer entry, which can be the full bus width, or whether a bus write access to the external data bus can be less than the full bus width. Thus, under certain operating circumstances less than the full data width may be transferred from the BIU to the system data bus to conserve power. For example, optimization of the bus write access size for power consumption can reduce the data transfer size while ensuring that at least the modified bytes in a store buffer entry are written.

Gathering of store requests may reduce the number of store buffer entries occupied by store requests for certain sequences of instructions executed by the central processing unit. Gathering can also reduce the number of system bus write operations performed to retire stores to the target location on the system bus. Gathering may be constrained or unconstrained, depending upon the attributes of the device at the destination location and the types of interfaces used by the data processing device. Due to the possible variety of constraints placed on gathering, store gathering policies are selected to meet the system interface constraints or for other operational reasons. Store buffer control circuitry may select a gathering policy based upon a control setting that may be user programmed or determined based on a destination address or attributes of a device at a destination address. Additional gathering opportunities may available under certain operating conditions. For example, in a constrained environment, a cache access procedure may allow more store requests containing the sparse data to be gathered in a system constrained to only writing contiguous data on the system bus. The store buffer will implement the gathering policy prior to providing store requests from store buffer entries to the interface of the data processing device, for example, a BIU.

Figure 1:
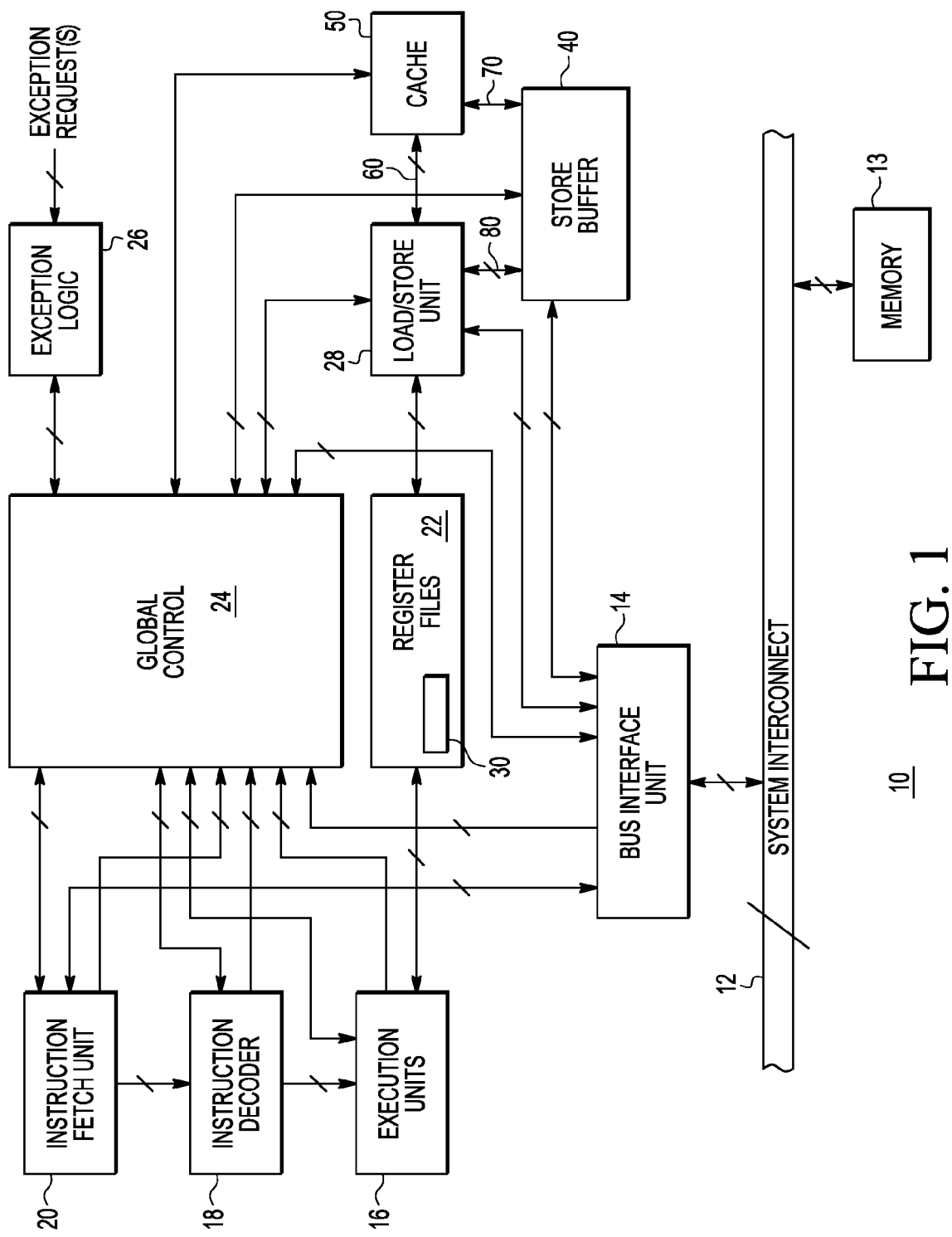
FIG. 1 is a block diagram illustrating a data processing device in accordance with a specific embodiment of the present disclosure.

FIG. 1 illustrates an embodiment of a data processing system 10 which determines a store gathering policy for gathering store requests in a store buffer to reduce write operations to a system interconnect 12 which stores the gathered store request data information in memory 13. The data processing system 10 may also determine whether to enable or disable a cache lookup of cache line values to update a store buffer entry during gathering. A system interconnect 12 functions to communicate data within the data processing system 10. In one embodiment, system interconnect 12 may be implemented as a multiple-bit system bus. Alternatively, it may be implemented as a cross-bar switch, or as a point-to-point or other interconnection mechanism. A system memory 13 is connected to system interconnect 12 for storage of information in data processing system 10. A bus interface unit (BIU) 14 has a first input/output connected to the system interconnect 12.

Data processing system 10 also includes one or more execution units 16, an instruction decoder 18, an instruction fetch unit 20, register files 22, global control 24, exception logic 26, a load/store unit 28, store buffer circuitry 40, and cache circuitry 50. A second input/output of BIU 14 is connected to a first input/output of instruction fetch unit 20. An output of BIU 14 is connected to a first input of global control 24. A third input/output of BIU 14 is connected to a first input/output of load/store unit 28. A fourth input/output of BIU 14 is connected to a first input/output of buffer 40. A second input/output of instruction fetch unit 20 is connected to a first input/output of global control 24. A first output of instruction fetch unit 20 is connected to a second input of global control 24. A second output of instruction fetch unit 20 is connected to an input of instruction decoder 18. An input/output of instruction decoder 18 is connected to a second input/output of global control 24. A first output of instruction decoder 18 is connected to a third input of global control 24. An output of execution units 16 is connected to a fourth input of global control 24. A second output of instruction decoder 18 is connected to a first input of execution units 16. A third input/output of the global control 24 is connected to a first input/output of execution units 16. A second input/output of execution units 16 is connected to a first input/output of registers files 22. Register files 22 include one or more register files 30. A fourth input/output of global control 24 is connected to an input/output of exception logic 26. Exception logic 26 also has an input for receiving exception requests. A fifth input/output of global control 24 is connected to a first input/output of cache 50. A sixth input/output of global control 24 is connected to a second input/output of buffer 40. A seventh input/output of global control 24 is connected to a second input/output of load/store unit 28. A third input/output of load/store unit 28 is connected to a second input/output of register files 22. A fourth input/output of load/store unit 28 is connected to a second input/output of cache 50. A fifth input/output of load/store unit 28 is connected to a third input/output of buffer 40. A third input/output of cache 50 is connected to a fourth input/output of buffer 40. An eighth input/output of global control 24 is connected to a fifth input/output of BIU 14. It should be understood that the location of control circuitry within the data processing system 10 is implementation specific. For example, various control circuitry will be located within each of the functional units of instruction fetch unit 20, instruction decoder 18, execution units 16, register files 22, cache 50, and buffer 40 for more limited control than global control 24. It will be appreciated that each of the illustrated interconnects are presumed to be implemented by one or more conductors.

In operation, global control 24, instruction fetch unit 20, instruction decoder 18, execution units 16, exception logic 26, register files 22, load/store unit 28, BIU 14, system interconnect 12, and memory 13 all operate as known in the art and will not be described in more detail herein except to the extent needed to describe operation of buffer circuitry 40 or cache circuitry 50. Details of buffer circuitry 40 or cache circuitry 50 will be discussed with respect to FIGS. 2-13. Note that all of system 10 can be located on a single integrated circuit, such as an integrated circuit die or package, or may be located on a plurality of integrated circuits. Also, note that a variety of different architectures may be used which includes buffer circuitry, optional cache circuitry, or combination cache and buffer circuitry.

Figure 2:
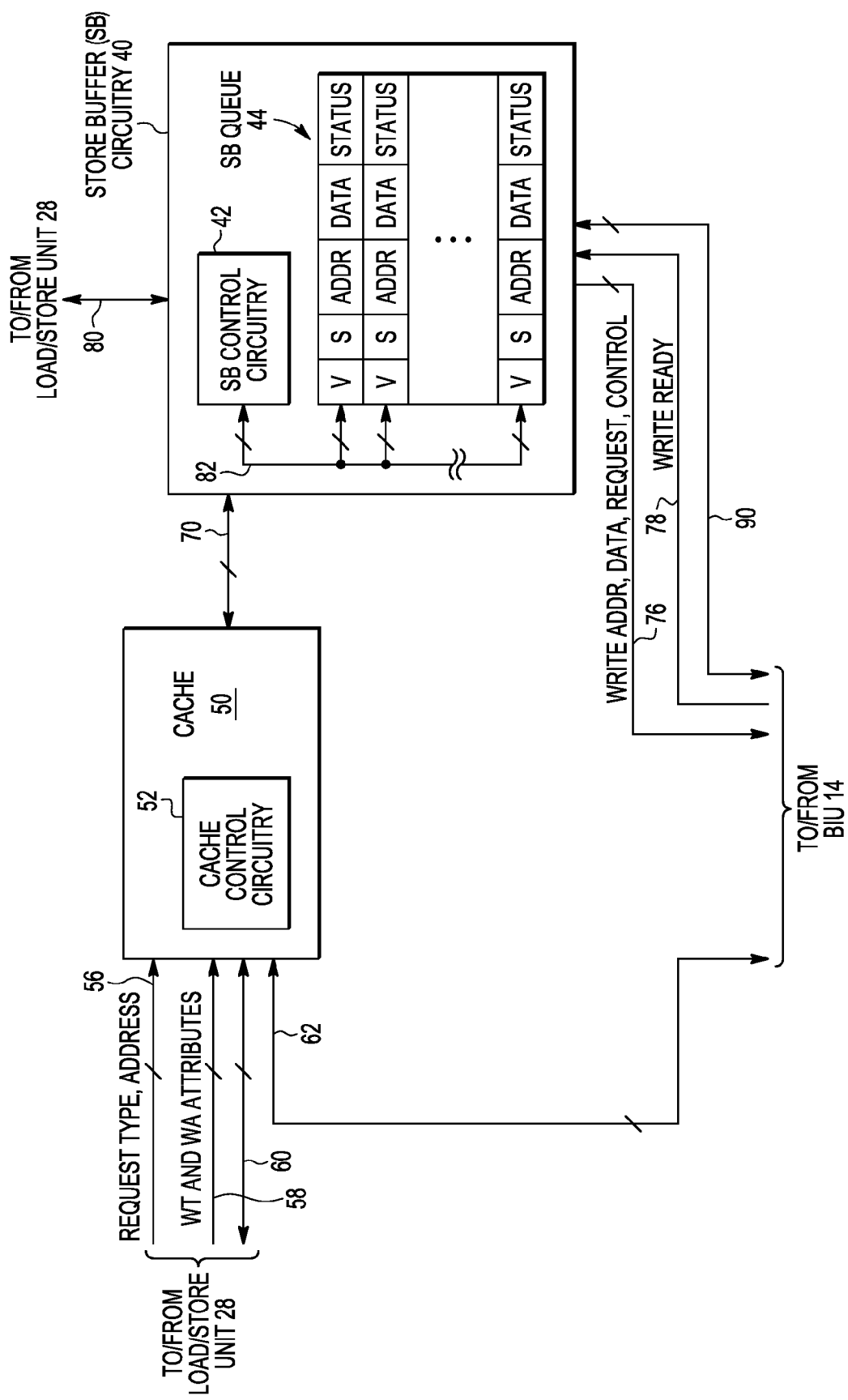
FIG. 2 is a diagram of a store buffer of FIG. 1 in accordance with one embodiment of the present disclosure.

FIG. 2 illustrates, in block diagram form, a portion of store buffer 40 and cache circuitry 50 of data processing system 10, in accordance with one embodiment of the present disclosure. Store buffer 40 includes store buffer control circuitry 42 and is bidirectionally coupled to each of load/store unit 28, and BIU 14. Store buffer control circuitry 42 in store buffer 40 is coupled, via conductors 82, to each entry of store buffer queue 44 such that store buffer control circuitry 42 can update appropriate fields of a selected entry, as needed, and can output the next entry to BIU 14.

Store buffer 40 may receive store requests and data words to be written to memory 13 from load/store unit 28. Therefore, store buffer 40 can receive a corresponding request address, a writethrough (WT) attribute, and a write allocate (WA) attribute corresponding to each store request via interconnect 80. Store buffer 40 provides a write address, write data, a write request, and write control to BIU 14 via interconnect 76, which can then be communicated to system interconnect 12 by BIU 14. Store buffer 40 also receives a write ready signal from BIU 14 via interconnect 78 which can be communicated from system interconnect 12 by BIU 14. Other signals may be communicated, as needed between system interconnect 12 (and, e.g., memory 13) and store buffer 40 via BIU 14 via conductors 90.

Store buffer queue 44 can be implemented in hardware in various manners, including as a circular queue. Each entry in store buffer queue 44 includes a valid bit (V), a store type bit (S), an address field (ADDR), a data field (DATA), and associated status information (STATUS). In the illustrated embodiment, each data field has a size of eight bytes (a doubleword) and when the constrained gathering policy is used, the status information includes size information of the valid store data that is within the data field. In the alternative, when unconstrained gathering is used, the status information may include bytestrobe flags indicating the bytes of altered (valid) data. In one embodiment, the S bit of an entry of store buffer queue 44 indicates whether that entry is a writethrough entry that stores a writethrough store access, (a writethrough entry) or is a copyback entry that stores a store access.

Store requests may be cacheable or non-cacheable. Entries in the store buffer may be allocated in response to a writethrough store operation, e.g., a store request, issued by a data cache 50 in the data processing device 10. Alternatively, entries of the store buffer may be allocated in response to a store request issued by the processor pipeline directly to the store buffer 40. For example, a load-store unit 28 may issue the store request directly to store buffer 40 via interconnect 80.

Store buffer 40 is used for buffering store requests prior to providing them to the system bus interface unit (BIU) 14 and the system bus interconnect 12 for storage into memory 13. The store buffer 40 enables decoupling the retirement of a store operation to the system bus interface unit from operation of the processor pipeline or cache. For example, a store request by the load/store unit 28 to the memory 13 is considered complete once the request has been made to the store buffer 40, thus allowing the pipeline to continue execution even though the data information has not yet been stored at the memory 13. The store buffer 40 contains multiple entries in store buffer queue 44. As described above, store buffer entries hold store addresses, data, and control and status information.

Control or status information of a store buffer entry may contain data size indicators (flags) indicating the size of the valid data information stored in the store buffer entry. Since the store buffer entry data field width is as large as the size of the largest store operation performed by load/store unit 28 (e.g. 8 bytes, or a doubleword), when a narrower width store is generated (such as a byte, halfword (2 bytes) or word (4 bytes) store), only a certain portion of the data field will hold altered (valid) data for the store. The data size indicators thus are used to indicate the size of the currently buffered data. An individual store buffer entry will be allocated for each write operation, regardless of the store data size, when no gathering is used, which results in the store buffer 40 executing a separate store request to the BIU 14 to complete each store operation. However, to reduce the number of occupied store buffer entries and write operations to the system bus, store requests may be gathered in the store buffer. Through the use of gathering, multiple store requests targeting a data location on system bus 12, which are smaller than the store buffer entry width, can be stored in the same store buffer entry of store buffer queue 44.

Gathering of store requests reduces the number of store buffer entries occupied by store requests by condensing multiple store requests targeted to a location in one store buffer entry. This frees up store buffer entries in the store buffer queue 44. Additionally, only one system bus write operation to the target data location 13 needs to be performed by the store buffer 44 to retire an entry of the store buffer 44 containing data information from multiple stores.

Store buffer control circuitry 42 conducts gathering at the store buffer 40. When a new store request is received at the store buffer 40, store buffer control circuitry compares the address of the incoming store request with addresses for store requests already stored in allocated store buffer entries. If an address match is detected, the incoming store request is allocated to the entry with the matching address. The data is merged in the store buffer entry. If no address match is made with a store buffer entry, the store buffer control circuitry 42 allocates a new entry. In an alternative embodiment, address tags may be assigned to store buffer entries for comparison of addresses.

Gathering may be constrained or unconstrained. Constrained versus unconstrained gathering may have tradeoffs for power consumption and performance characteristics of the data processing system 10. Constrained and unconstrained gathering may also be determined based on constraints with the system interface such as BIU 14, system bus 12, and memory 13.

In the unconstrained case, any store request or portion of a store request may be gathered into a store buffer entry. The gathered data information may be stored at non-adjacent bytes of the store buffer entry, where the byte locations in between the stored data information does not store current data, e.g., they do not contain data that is to be stored and therefore is invalid. According to an embodiment, the unconstrained case utilizes bytestrobe signaling to communicate the location of the valid stored data information in the store buffer entry since the bytes of data information need not be aligned and contiguous. In particular, each entry of the store buffer 44 includes a bytestrobe flag that indicates bytes of an entry containing valid data. Such a bytestrobe flag field can be sparse, e.g., contain invalid byte locations between valid byte locations, thereby indicating gaps in the data information stored in the store requests of a store buffer entry. In one embodiment, the bytestrobe field may consist of eight bits, where each bit corresponds to a byte position in the data field of a store buffer entry. Thus, if the bytestrobe field indicates a value of 10110000, bytes 0, 2, and 3 of the data field are valid, and correspond to stores received by and gathered into the entry. The interface between the store buffer 40 and the destination device, e.g., memory 13, needs to be able to handle bytestrobe signaling and processing, in which sparse bytestrobe encodings are possible; otherwise, the unconstrained gathering case may be unavailable.

In an embodiment described below, cache lookups can be enabled for the purpose of filling gaps between valid bytes of a store buffer entry, wherein unaltered byte locations of a store buffer entry are filled with valid data from cache 50. For example, when a cache hit occurs for a target memory address of a store buffer entry, the store buffer entry may be filled with additional unmodified data from the cache hit location. While the individual bytestrobes may be maintained for the gathered data of an entry to indicate which data is altered or stored, valid data from the cache that is contiguous and aligned fills the store buffer entry 44 after the cache lookup when a cache hit occurs. This filling may, in one embodiment, fill the entire data width of the store buffer entry 44. A flag is set to indicate that the filling from cache has been performed and that the entire data width may be written in a single transaction to the system bus. Thus, despite gaps between store requests due to unconstrained gathering, the non-contiguous store requests are merged into the store buffer entry 44 with contiguous and aligned valid data obtained from a cache hit to the corresponding address in the store buffer entry. The store buffer entry now may be written to a BIU 14, bus 12, or memory 13 even if that data pathway cannot accommodate byte strobe signaling.

In the constrained gathering case, bytestrobe signaling is not used to communicate a write operation on the bus 14, and, therefore, data information gathered into a store buffer entry 44 must be contiguous and aligned. Gathering store requests is thus constrained based on particular sizes of the store requests or alignment of gathered store requests. A data size flag can be used to indicate the number of contiguous and aligned bytes of data information stored in a store buffer entry pursuant to one or more store requests. For example, the status field of an entry can be used to store a size indicator instead of a bytestrobe flag for data stored at a buffer entry, wherein the size indicator indicates the size and alignment constraints on the gathered store requests. In one embodiment, the size indicator may consist of two bits which encode the size of the valid data in the entry as 00=byte, 01=halfword, 10=word, and 11=doubleword.

In an embodiment described below, if cache lookups are enabled, then non-contiguous store requests may still be gathered despite constraints on write transfers to the system bus that do not allow noncontiguous data transfers. In this embodiment, the invalid byte locations between valid bytes, e.g., bytes altered by the store request, can be filled with valid data by merging the gathered write data with valid data from cache 50. According to an embodiment, this assumes a cache hit on a cache line coherent with the target memory address. While the individual bytestrobes may be maintained for the gathered data to indicate which data is altered or stored, valid data that is contiguous and aligned fills the store buffer entry 44 after the cache lookup and a cache hit. This filling may, in one embodiment, fill the entire data width of the store buffer entry 44. A flag is set to indicate that the filling from cache has been performed and that the entire data width may be written in a single transaction to the system bus. Thus, despite gaps between data bytes from gathered store requests, the non-contiguous store requests are placed into the store buffer entry 44, and the gaps between gathered data filled with the existing data values.

In an alternate embodiment also described below, a full width write transfer to the system bus may not be necessary. Instead, the store buffer can optimize the size of the system bus write access by determining the locations of modified data within the entry, e.g. the gathered data, the size of the transfer may be less than the full width to yield reduced power consumption.

Store buffer control circuitry 42 may select a gathering policy to accommodate unconstrained gathering, constrained gathering or no gathering. The gathering policy can be selected based upon a user programmed control setting, or based on one or more of the following: a destination address of a destination device, attributes of a destination device; attributes of a store buffer entry; and the like. Whether or not gathering is selected, and if so, whether the gathering is to be constrained or is allowed to be unconstrained can depend on the type of external interfaces used throughout the data processing device to communicate particular data information. The need for constrained gathering may arise based on bus bridges used, system peripheral interfaces, or memory interfaces. In an embodiment, certain of these elements may not support the use of individual bytestrobe signals, but may only utilize an encoded size field as previously described. For example, flash memory interfaces, SRAM interfaces, peripheral bridge interfaces, DMA unit interfaces, Nexus Debug Unit interfaces, and other interfaces may impact constraints placed upon the store request gathering. Attributes and capabilities of devices at destination data locations on the system bus can also affect the existence or type of constraints that may apply to gathering the store requests.

A store gathering policy indicator may be set to determine the store gathering policy to be implemented. The store gathering policy indicator can be set to indicate if no store gathering occurs, if store gathering is constrained, or if store gathering is unconstrained. The store gathering policy indicator can also be set such that the store buffer 40 determines a gathering policy based upon the destination address of the store operation or the attributes of the device located there.

In the illustrated embodiment, data processing system 10 includes a cache 50. Cache 50 includes cache control circuitry 52 and is bidirectionally coupled to each of load/store unit 28, store buffer 40, and BIU 14. Although all inputs and outputs are illustrated as going to or coming from cache 50, some or all of the inputs or outputs may be going directly to or directly from cache control circuitry 52 within cache 50.

When a cache 50 is implemented in data processing system 10, cache 50 can receive load and store requests from load/store unit 28. Therefore, cache 50 receives a request type (indicating, for example, a store or load type) and a corresponding request address via conductors 56. Each store request has a corresponding store address (provided by conductor 56) and associated attributes, and may also be referred to as a store access or a write access. Cache 50 also receives a writethrough (WT) attributes and a write allocate (WA) attributes corresponding to each load and store request via conductors 58. These attributes can be provided for each store request in a variety of different ways, as known in the art. For example, they may be provided from load/store unit 28 for each store request. Alternatively, they may be provided by a memory management unit (MMU) (not shown), where each memory page has a particular set of attributes. In this case, the memory page which the store request is accessing indicates the values of WT and WA. In yet another example, cache control circuitry 52 may generate or provide the WT and WA attributes. Other signals may be communicated between load/store unit 28 and cache 50 via bidirectional conductors 60. For example, data may be communicated via a data port of cache 50. Therefore, the store data associated with a store request can be provided to cache 50 via the data port by way of conductors 60.

In the case of a writethrough store request where WT attribute is asserted, the writethrough store access is provided to store buffer 40 for storage into an entry of store buffer queue 44. The store requests with data and signals such as address, WT attributes, or WA attributes may be provided to store buffer 40 via conductors 70. Other signals may be communicated, as needed, between cache 50 and store buffer 40 via conductors 70 as well. The store buffer 40 will operate much as described above to perform a write operation to BIU 14.

Note that additional circuitry may be included in buffer circuitry 40 and cache circuitry 50, but have been omitted from FIG. 2 so as not to complicate the description. For example, buffer circuitry 40 and cache circuitry 50 may also include a linefill buffer and a copyback buffer (not shown) which operates as known in the art. Operation of FIG. 2 will be described in more detail in reference to FIGS. 3-8 below.

FIG. 3 illustrates a storage location, referred to as a store buffer control register 46. The illustrated embodiment is a 32-bit register used for extended store buffer control. The store buffer control register 46 may be located in the store buffer 40, as part of cache 50, or elsewhere in data processing device 10. The store buffer control register depicted has a two bit store gather control (STGC) field 48. This field holds a store gathering policy indicator also referenced by numeral 48. The store gathering policy indicator 48 is used to determine the store gathering policy to be used by the store buffer 40 to control gathering of multiple store requests into a store buffer entry. The store gathering policy indicator 48 may be user programmable. In the illustrated embodiment, the store gathering policy indicator 48 can specify a particular policy to be used, e.g., values "00", :01", "10", or can specify whether an alternate criteria is to be used to determine the policy, e.g., value "11" (FIG. 4). For example, when the store gathering policy indicator 48 is set to "11," the store gathering policy used by the store buffer 40 can be determined by the store buffer control circuitry 42 based on a store request destination address or attributes of a device located at a store destination address. This is described further below.

FIG. 4 illustrates a table of field descriptions showing the options for setting the store gathering policy indicator in the STGC field. The first column shows the designated bits in the store buffer control register 46. Column two illustrates the name assigned to each set of designated bits. The third column provides a description of what data in the designated field of bits reflects. As shown in the embodiment of FIG. 4, the store gathering policy indicator also determines whether or not store gathering is enabled at all (00—store gathering disabled). The store gathering policy indicator indicates whether the constraints exist on gathering data information into a store buffer entry (10—store gathering enabled, constrained). Constrained gathering requires store requests gathered in a store buffer entry to be aligned and contiguous. The store gathering policy indicator will also indicate whether non-contiguous bytestrobes are asserted and used for write operations of gathered stores to the BIU (01—store gathering enabled, unconstrained), or whether size signals are used for write operations of gathered stores to the BIU (10—store gathering enabled, constrained). Finally, the setting may be determined based on an address table discussed further below with respect to FIGS. 6 and 7 (11—store gathering depends on address). The STGC field is set at bits 2 and 3 of the store buffer control register, but may be stored at any location in the register.

Figure 5:
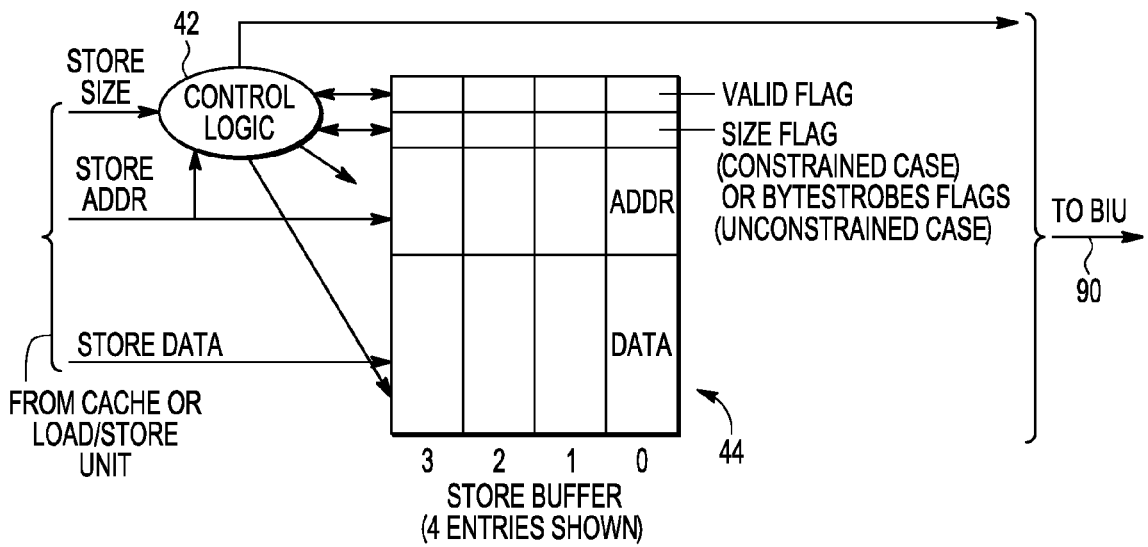
FIG. 5 is a block diagram of the store buffer structure of the store buffer of FIG. 1 in accordance with one embodiment of the present disclosure.

FIG. 5 illustrates the store buffer with store buffer control logic 42 and a store buffer queue 44 having four entries (0-3) in accordance with the example store gathering policy. Store request data size and store request address information are provided to store buffer control logic 42. Each entry contains a validity flag, status field, address field, and data information field. The store address information and store size information may be used by the control logic 42 to determine the store gathering policy. Alternatively, the store gathering policy can be accessed from a control registers, such as that described with reference to FIG. 3. Upon determining the store gathering policy to be implemented, the store buffer control circuitry 42 determines whether store gathering is available in a store buffer entry by seeking to match an address for the incoming new store request. Upon determination that gathering is available, the store buffer control logic gathers store data words into data field of the matched store buffer entry in queue 44. If constrained gathering, a data size flag is set in the status field indicating the alignment and location of contiguous data bytes gathered in the entry. The data size flag will indicate the size of the eventual write operation to BIU 14 via conductor 90. If unconstrained gathering, bytestrobe flags are set in the status field indicating the locations of potentially non-adjacent gathered data bytes in the entry. The strobe flags will indicate which byte lanes contain new data in the eventual write operation to BIU 14 via conductor 90.

Figure 6:
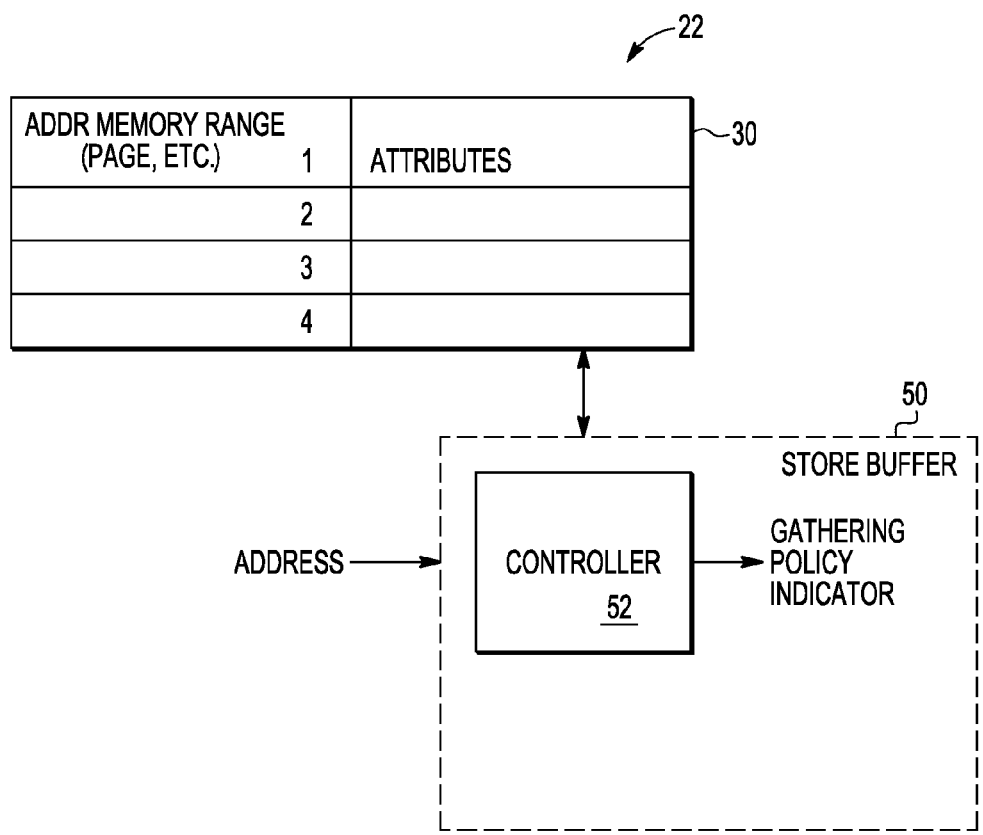
FIG. 6 is a block diagram of the store buffer controller circuitry of FIG. 2 in accordance with one embodiment of the present disclosure.
Figure 7:
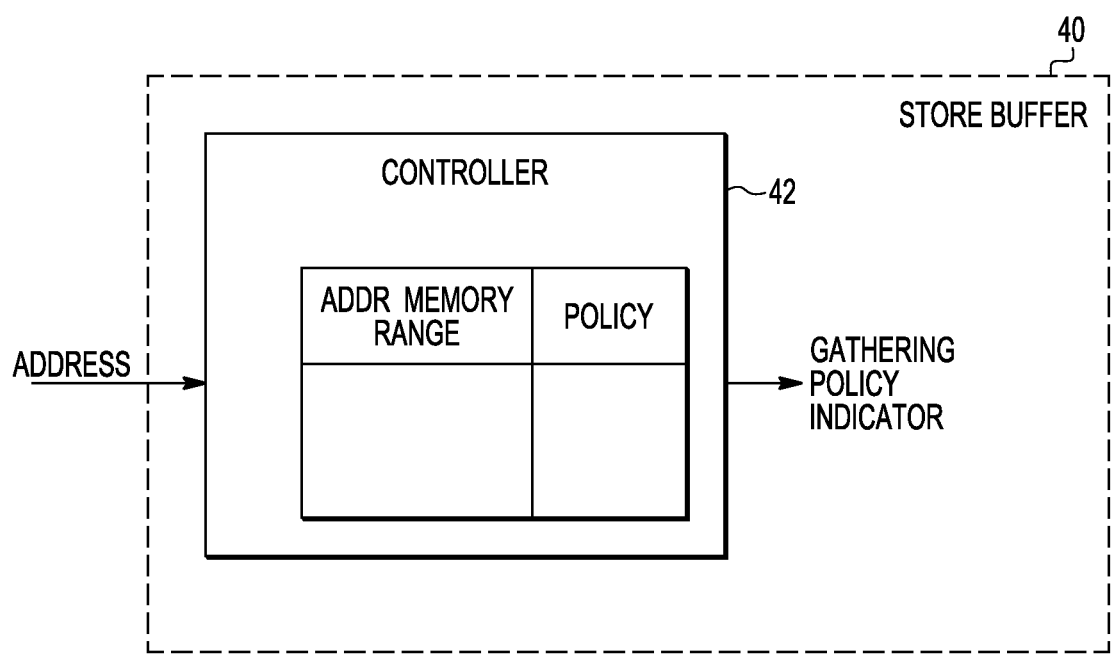
FIG. 7 is another block diagram of the store buffer controller circuitry of FIG. 2 in accordance with another embodiment of the present disclosure.

FIGS. 6 and 7 illustrate two embodiment variants of determining a store gathering policy utilizing an address table 30, e.g., when the control indicator STGC has a value of 11, based upon the memory mapped address range of a memory being accessed, such as memory 13. With respect to FIG. 6, address table 30 is accessed by the controller 42 that associates memory address ranges to specific device attributes associated with devices located at particular address ranges. Thus, in operation, store buffer controller 42 may cross reference the received address information using the address table 30 to determine one or more attributes of a memory or device being accessed, which can be used to determine whether the device at that address range is capable of handling gathering, and more specifically whether the device is capable of handling constrained or unconstrained gathering. For example, an attribute that indicates a memory or device does not support strobe flags would result in the store buffer implementing constrained buffering, instead of unconstrained buffering. Address table 30 may reside in register files 22 as illustrated in FIG. 1, at the store buffer 40, or in other storage locations. By way of example, if a memory device 13 at address range 1 in the address table 30 cannot process or receive bytestrobe flags, then the data gathering policy will have to be constrained due to the limitations of the device. Store request size data received at the store buffer control 42, may also be used to determine a size flag for the gathered buffer entry. Additionally, the interface with memory device 13 may only be capable of accommodating data words of a certain size or alignment. That may be reflected in the size flag determined for the store gathered data words in an entry.

FIG. 7 illustrates another embodiment of determining a store gathering policy utilizing a different type address table 30. Address table 30 of FIG. 7 associates memory address ranges to a specific store gathering policy. Store buffer controller 42 may cross reference the received address data with the address table 30 to determine the store gathering policy to be implemented at the store buffer 40. Address table 30 may be received from register files 22 as illustrated in FIG. 1. Alternatively, address table 30 may be stored in the store buffer 40. By way of example, if a memory device 13 at address range 1 in the address table 30 is associated with a constrained store gathering policy, then the store gathering policy indicator for a constrained policy is set. Store request size data received at the store buffer control 42, may determine a size flag for the gathered buffer entry.

Figure 8:
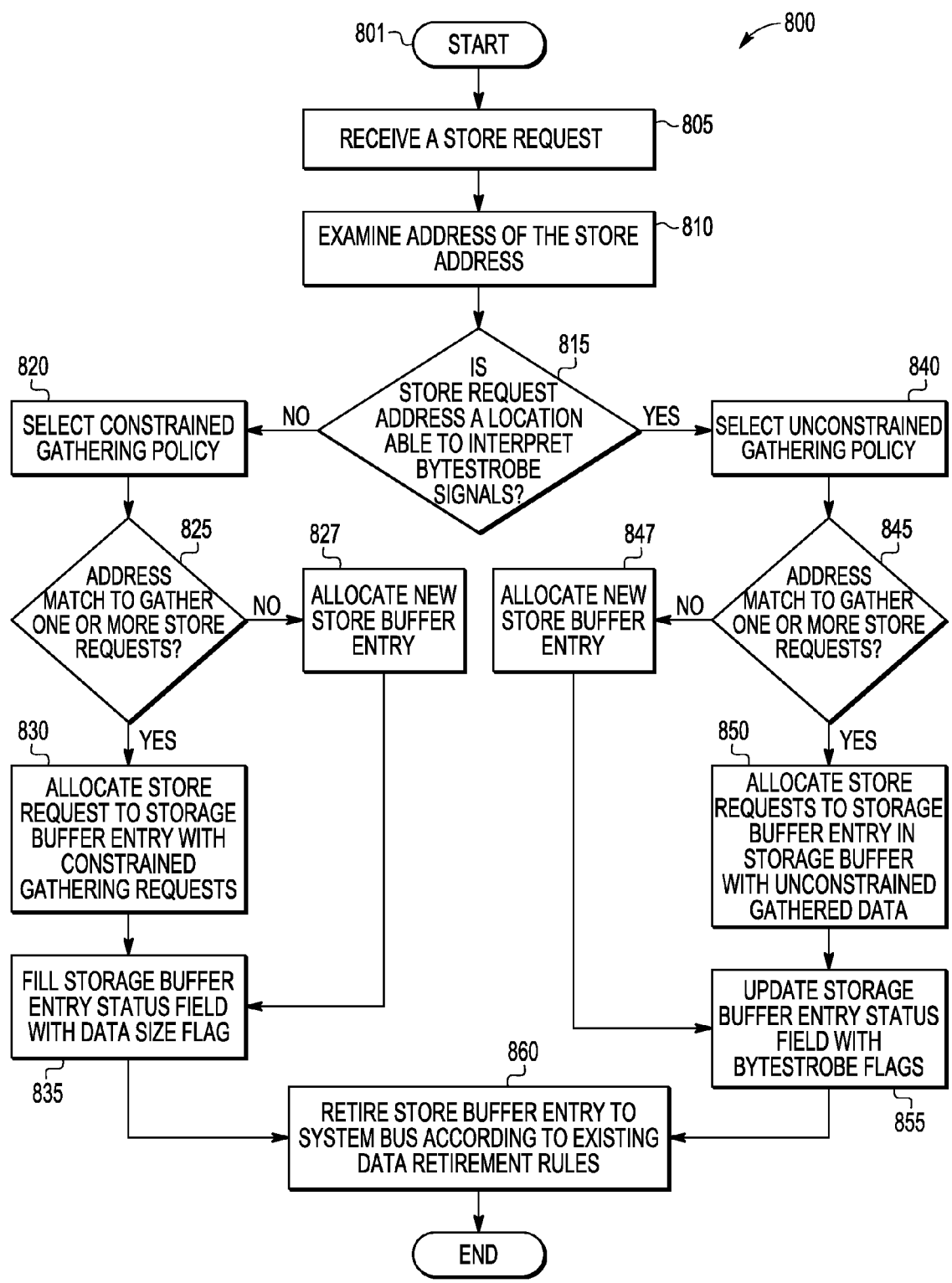
FIG. 8 is a flow diagram of a method of determining the store buffer gathering policy of the data processing device of FIG. 1 in accordance with one embodiment of the present disclosure.

As described above, store gathering policy indicator 48 in the STGC field may indicate no gathering (00—store gathering disabled), constrained gathering (10—store gathering enabled, constrained), unconstrained gathering permitted (01—store gathering enabled, unconstrained), or may be determined on a store request-by-store requested basis based on other factors (11—store gathering depends on address). FIG. 8 illustrates focuses on an embodiment when the store gathering implemented depends on an address or attributes of a device at a destination address (11—store gathering depends on address).

FIG. 8 illustrates, in flow diagram form, operation of buffer circuitry 40 in accordance with one embodiment of the present disclosure that supports use of table 30 to determine the type of gathering to be implemented, if any. Flow 800 begins with start 801 and proceeds to block 805 where buffer 40 receives a new store request (which may also be referred to as a store access request or a store access). This new store request may be received from load/store unit 28, which operates as known in the art, or it may be received from cache 50 which operates as known in the art. Flow proceeds to block 810 where the address of the store request is examined by the store buffer control circuitry 42.

Flow proceeds to decision diamond 815 where it is determined whether the store location destination address is at an interface capable of interpreting bytestrobe signals. If not, flow proceeds to block 820 where the store buffer control circuitry 42 selects the constrained store gathering policy indicator, note that the gathering policy indicator 48 (STGC) shown in FIG. 3 will remain set to 11 to allow subsequent store requests to implement the same or different gathering policies. Flow proceeds to block 825 where, the store buffer control circuitry 42 determines if there is an address match with an existing store buffer entry for gathering the new store request. If not, the flow proceeds to block 827 where the store buffer control 42 allocates a new entry in the store buffer queue 44 for the new store request. If there is a gather address match however, the flow proceeds to block 830 to allocate the store request to the matched store buffer entry.

Based on the determination of the store gathering policy indicator, the new store request is allocated under a constrained gathering policy to the matched entry. The data information in the new store request must be merged with the existing data in the matched store buffer entry so that the gathered data information is contiguous and aligned in the buffer entry. The flow proceeds from block 827 to block 835 or from 830 to block 835 where the store buffer control circuitry 42 then fills or updates the storage buffer entry status field of the respective buffer entry with data size flag information. The flow proceeds to block 860 where the store buffer 40 retires each entry in the store buffer queue according to the existing data retirement rules for the store buffer.

If at decision diamond 815 it is determined that the store location destination address is an interface capable of interpreting bytestrobe signals, flow proceeds to block 840 where the store buffer control circuitry 42 selects the unconstrained store gathering policy indicator, note that the gathering policy indicator 48 (STGC) shown in FIG. 3 will remain set to 11 to allow subsequent store requests to implement the same or different gathering policies. Flow proceeds to block 845 where, the store buffer control circuitry determines if there is an address match with an existing store buffer entry for gathering the new store request. If not, the flow proceeds to block 847 where the store buffer control 42 allocates a new entry in the store buffer queue 44 for the new store request. If there is a gather address match, the flow proceeds to block 850 to allocate the store request to the matched store buffer entry. Since the new store request is allocated under an unconstrained gathering policy, the data information in the new store request, or a portion thereof, may be merged with the existing data in the matched store buffer entry with or without gaps. The gathered data information may be non-contiguous. The flow proceeds from block 847 to block 855 or from block 850 to block 855 where the store buffer control circuitry 42 updates the storage buffer entry status field of the respective entry with current bytestrobe flag information. The flow then proceeds to block 860 where the store buffer 40 retires each entry in the store buffer queue according to the existing data retirement rules for the store buffer.

In an alternate embodiment, when a data processing system environment requires that store requests within a store buffer entry be contiguous and aligned when written to the system interconnect, non-contiguous and non-aligned store requests may still be gathered at the store buffer, so long as the missing data is ultimately provided to form contiguous aligned data. This is done in a data processing system 10 having a cache 50 (FIG. 1), and a cache lookup function enabled to fill-in data gaps so that non-contiguous store requests that are smaller than the data width of the store buffer may be gathered. In the example discussed, the data width is an 8 byte boundary. The cache lookup option requires that the store requests be cacheable and that a cache lookup function be enabled. Control may be provided over enabling the cache lookup/gap-filling function with a user programmable control field such as the store read cache control (STRC) indicator.

Before allocating a store buffer entry for a store request and before merging the store request with data already in a store buffer entry from a previous request, the data processing system may perform a cache lookup to determine if the store requests are cacheable, and in a particular embodiment whether there is a cache hit for the store requests. With a cache hit, cache data is supplied to the store buffer and merged with the gathered store requests in the store buffer entry to fill the entire width of the store buffer entry with valid data. Gaps between non-contiguous and non-aligned store requests can, therefore, be filled with valid data from the cache line. This assumes that cache coherency is maintained with the target memory 13.

In an alternative embodiment, the method described may elect to fill a cache line for an address in the event of a cache miss, so long as the store request is cacheable, and then fill-in the missing bytes of a store buffer entry when the information is returned to the cache. With either case, the system may set a flag to indicate that the store buffer entry is filled and that a full width write operation may be written in a single transaction to the system bus. Individual bytestrobe flags are also stored in the store buffer and can be used to prevent gathered bytes from previous stores from being overwritten should a subsequent cache hit transfer data to the store buffer entry when the store buffer and cache are not coherent. This may occur, for example, with a subsequent store request.

The cache lookup may also be disabled by the user programmable STRC control field. In that case only stores which are contiguous and which form aligned halfword, word, or doubleword data size can be gathered and merged. This gathering is similar to the constrained gathering described above. Whether to enable or disable a cache lookup function may depend on performance trade-offs. A cache lookup requires a cache access time slot but provides additional opportunities to gather and merge data into store buffer entries. Merging of store requests in store buffer entries saves system bus cycles. Thus, whether to perform cache lookups may depend on how often store requests are merged, cache hit rates, and external memory timing. User programmable control permits management of the data processing system 10 to maximize power and performance tradeoffs while keeping in line with data processing system constraints.

User programmable control of the cache lookup function may not be necessary in some embodiments. For example, if non-aligned store requests already perform cache reads as part of a read-modify-write sequence that maintains error coding for data contained in the cache, then the cache lookup function is already part of this process. In another example, cache reads may occur as part of maintaining coherency of a cache line for a certain cache line address. In cases such as these, there is no need for user programmable control for the cache lookup function since cache reads already occur.

Next consider an example case wherein a sequence of four individual byte store requests write to addresses 0, 2, 5, and 6 and the writes are all smaller than the 8-byte data width of the store buffer entries. Furthermore, the store requests are not all contiguous and aligned. Nonetheless, if cache lookup function is enabled and a cache hit is detected, these store requests may be gathered into one store buffer entry with an address tag of 0x0000_0000, a data size indicating doubleword (8 bytes) and strobe flags with values 0b10100110. The merger of cache data for the target address with the store requests fills the data width of the store buffer entry with valid data. Although the write operation to the system interconnect does not support bytestrobes, the bytestrobes may nonetheless be stored at the store buffer entry as explained above. Bytestrobes are not driven on the system interconnect. Instead, the write operation to the system interconnect updates all 8 bytes from the store buffer entry data width at the target memory 13. The four store requests are considered sparse in that there are gaps within the 8 bytestrobe signals and the store requests are not aligned and contiguous. However, a single bus transaction retires all four store requests as an aligned and contiguous doubleword, using the unmodified data provided from the cache which was used on a cache hit to fill in the remaining intermediate data bytes between the sparse store requests within the store buffer entry.

FIG. 9 illustrates another embodiment of a storage location 46, specifically a store buffer control register. Similar to the embodiment depicted in FIG. 3, the illustrated embodiment is a 32-bit register used for extended store buffer control. Alternatively, the storage location 46 may be a cache control register. Accordingly, the storage location control register 46 may be located in the store buffer 40, as part of cache 50, or elsewhere in data processing device 10.

The store buffer control register 46 depicted has a two bit store gather control (STGC) field 48 as described above with respect to FIG. 3. This field holds a store gathering policy indicator also referenced by numeral 48. In addition, the store buffer control register 46 has a single bit store read cache control (STRC) field 49. The store read cache control field 49 is used to determine whether the cache read is available to support the store gathering policy selected in accordance with the STGC to be used by the store buffer 40 to gather multiple store requests into a store buffer entry 44. In this example embodiment, the data processing device 10 performs a cache lookup on the address of data to be gathered in the store buffer entry 44. The cache read option may be enabled in connection with store gathering of any type under STGC, except if store gathering is disabled. In particular, store read cache control (STRC) is useful in the case where gathered stores are required to be contiguous and aligned once gathered in the store buffer entry 44 and presented to BIU 14, bus 12, or memory 13 when that data pathway cannot accommodate sparse byte strobe signaling. As before, this may be due to limitations in the interface(s) or bus(es) between the store buffer 40 and the memory 13. Or it may be due to limitations of the destination memory 13 itself. The store read cache control indicator 49 is user programmable. In the illustrated embodiment, the store read cache control indicator 49 can specify whether a cache lookup or cache read is enabled or disabled for the purposes of filling a store buffer entry with unmodified cache data, e.g., value "0" can specify that a cache read is disabled and value "1" can specify that a cache read is enabled for filling a store buffer entry with unmodified cache data to be combined with one or more sparse store operations gathered by an store buffer entry, and thus allowing subsequent external bus accesses which flush a store buffer entry to be performed as full width accesses (FIG. 10). In an embodiment, the cache read operation for filling the store buffer with unmodified data from the cache may be conditioned on whether a previous cache read has already filled the remaining portions of a store buffer entry, and thus a subsequent read is not required and would be inefficient if performed. This is described further below.

FIG. 10 illustrates a table of an embodiment of field descriptions showing the options for setting the store gathering policy indicator in the STRC and STGC field. The first column shows the designated bits in the store buffer control register 46. Column two illustrates the name assigned to each set of designated bits, STRC and STGC in this embodiment. The third column provides a description of what data in the designated field of bits reflects. As shown in this embodiment of FIG. 10, the store read cache control indicator indicates whether (1—enabled) or not (0—not enabled) cache lookups are enabled for filling of remaining sparse byte locations when a store is gathered into a store buffer entry, and, if enabled, that external write accesses of gathered stores are performed at full width. The STRC field is set at bits 1 of the store buffer control register 46, but may be stored at any location in the register.

The store gathering policy indicator STGC depicted in FIG. 10 works similar to the STGC indicator described with reference to FIG. 4. The STGC determines whether or not store gathering is enabled at all (00—store gathering disabled). The store gathering policy indicator indicates if constraints exist on gathering data information into a store buffer entry (10—store gathering enabled, constrained, or 01—store gathering enabled, unconstrained). Constrained gathering requires store requests gathered in a store buffer entry to be aligned and contiguous. However, if STRC cache look up is enabled, a cache hit may permit non-contiguous store requests to be gathered into aligned and contiguous group of locations of valid data in a store buffer entry.

The store gathering policy indicator will also indicate whether non-contiguous bytestrobes are asserted and used for write operations of gathered stores to the BIU (e.g., 01—store gathering enabled, unconstrained), or whether size signals are used for write operations of gathered stores to the BIU (e.g., 10—store gathering enabled, constrained). Finally, the setting may be determined based on an address table as discussed above with respect to FIGS. 6 and 7 (e.g., 11—store gathering depends on address). The STGC field is set at bits 2 and 3 of the store buffer control register, but may be stored at any location in the register.

Figure 11:
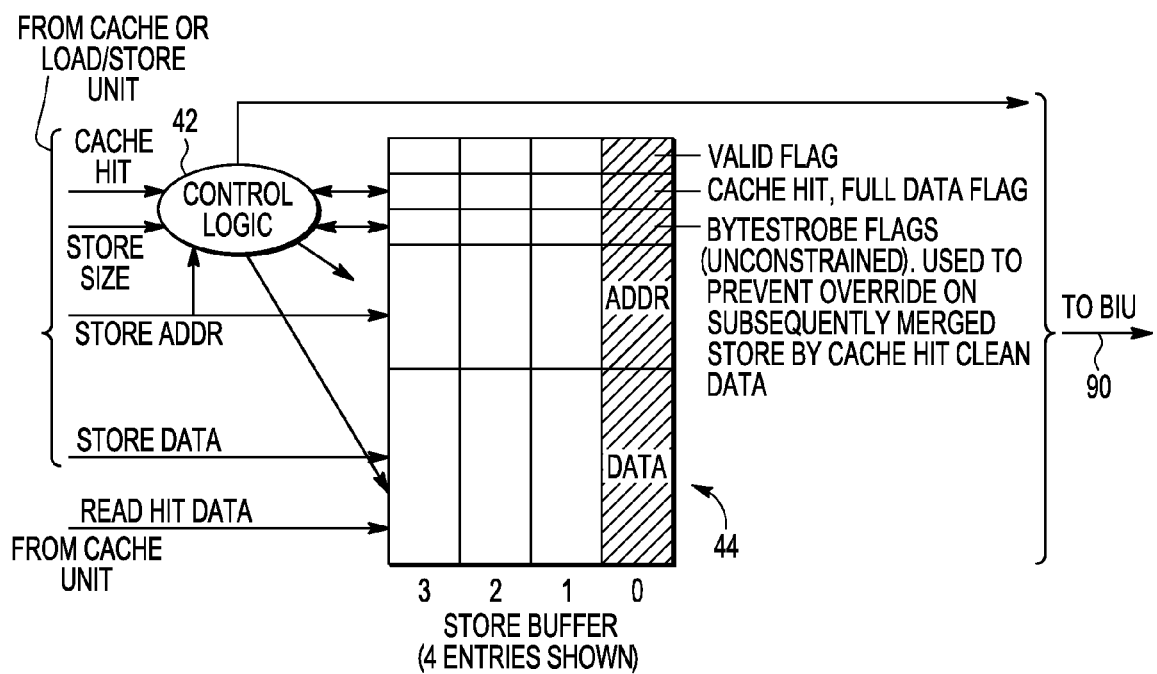
FIG. 11 is a block diagram of the store buffer structure of the store buffer of FIG. 1 in accordance with another embodiment of the present disclosure.

FIG. 11 illustrates another embodiment of the store buffer with store buffer control logic 42 and a store buffer queue 44 having four entries (0-3) in accordance with the example store gathering policy. Store request data size and store request address information are provided to store buffer control logic 42 as with the embodiment of FIG. 5. Additionally, cache hit information is provided to the control logic 42. Each entry contains a validity flag, a cache hit/full data flag, a status field, address field, and data information field. The store address information and store size information may be used by the control logic 42 to determine the store gathering policy. Alternatively, the store gathering policy can be determined from a store gather control STGC indicator from a control register, such as that described with reference to FIG. 9.

Upon determining the store gathering policy to be implemented, the store buffer control circuitry 42 seeks an address match between a received store request and previous store request data stored in a store buffer entry. If an address match is available, the store buffer control logic gathers the new store request data and merges it into the data field of the matched store buffer entry in queue 44. When cache lookup is enabled, non-contiguous store requests may be gathered with a cache hit for the target address. Bytestrobe flags are maintained for the gathered non-contiguous store requests to prevent an overwrite of those data locations when data from the cache is subsequently merged into the store buffer entry upon the cache hit. In the present embodiment, a data size flag is set indicating the full data width of the aligned, contiguous data bytes gathered in the entry are valid. The data size flag will indicate that the size of the eventual write operation to BIU 14 via conductor 90 is the full data width; 8 bytes in the example case. In addition, in some embodiments, the cache hit/full flag may be used to condition whether a cache read is enabled for a subsequent store which is gathered into the same buffer entry. Once a cache hit has provided the store buffer entry with enough unmodified data to "fill out" the gaps which would otherwise occur when a sequence of sparse writes is performed which correspond to the same store buffer entry address, a subsequent cache hit would be redundant, as the "full" flag for the buffer entry has already been set. In this embodiment, the actual cache read operation may be conditioned on whether the "full" flag has already been set for the entry, and no cache read for this purpose is performed, instead, the cache access slot is available for an unrelated cache access, which may result in improved system performance.

If unconstrained gathering is the policy selected, the bytestrobe flags are set and asserted as described above.

Figure 12:
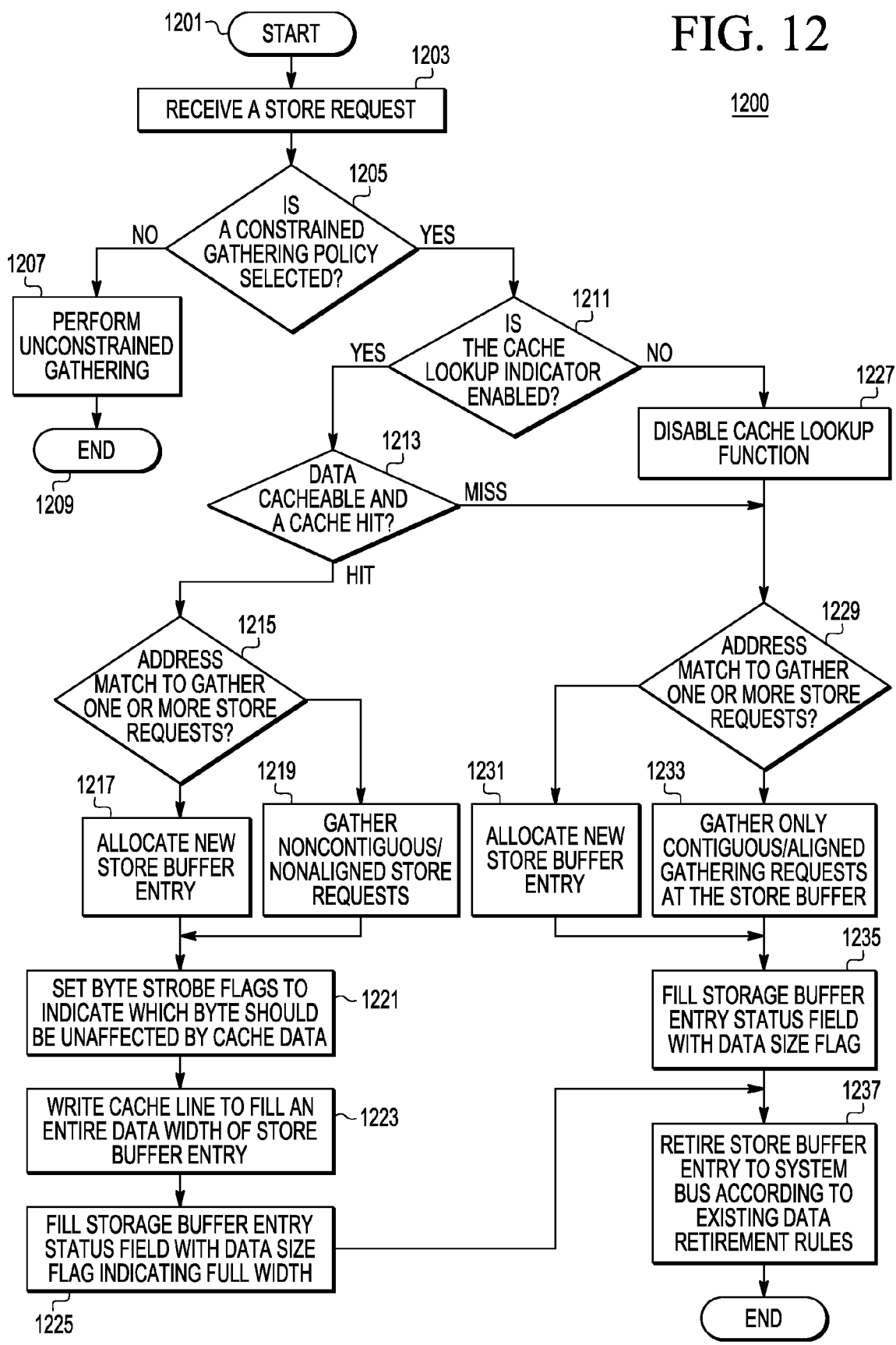
FIG. 12 is a flow diagram of a method of determining whether cache lookup is enabled for data gathering by the data processing device of FIG. 1 in accordance with another embodiment of the present disclosure.

FIG. 12 illustrates, in flow diagram form, operation of buffer circuitry 40 in accordance with one embodiment of the present disclosure that supports use of a cache lookup indicator and use of the table in FIG. 11 to determine the type of gathering to be implemented, if any. Flow 1200 begins with start 1201 and proceeds to block 1203 where store buffer 40 receives a new store request (which may also be referred to as a store access request or a store access). This new store request may be received from load/store unit 28, or it may be received from cache 50. Flow proceeds to decision diamond 1205 where the store gathering policy can be selected according to the methods and systems described above, for example via a store gathering policy indicator such as STGC in FIG. 11.

If unconstrained store gathering is selected, the flow proceeds to block 1207. Unconstrained gathering is performed and bytestrobe flags are stored with the store buffer entry. Proceeding to block 1209, the unconstrained gathered data may be retired and the bytestrobe flags are asserted to indicate to memory 13 on the system bus 12 which bytes contain modified data.

If constrained store gathering is selected at decision diamond 1205, the flow proceeds to decision diamond 1211 where it is determined if a cache lookup function is enabled, e.g., is STRC set to enable cache lookups. The store buffer control logic 42 determines whether the store read cache control indicator (STRC) is set to enable cache lookups.

If a cache lookup is enabled, the flow proceeds to block 1213 where a cache lookup is performed to determine if a cache hit occurs, assuming the address location is cacheable. With a cache hit, the system sets the cache hit/full data flag, and the flow proceeds to decision diamond 1215 where the destination target address of the received store request is examined by the store buffer control circuitry 42 to determine if there is an address match within the store buffer to permit gathering at a current store buffer entry containing a previously stored store request. If an address is not found matching the new store request, then the flow proceeds to block 1217 and a new store buffer entry is allocated. If a matching address is found, the flow proceeds to block 1219 where the information of the current store requests is gathered into the entry with the matching address. The store requests may be gathered in the store buffer entry, even if the store requests are non-contiguous and not aligned.

After either a new store buffer entry is allocated in block 1217 or an address-matched store buffer entry is found for gathering, the flow proceeds to block 1221. At block 1221, the bytestrobe flags are set and stored at the store buffer entry to indicate which bytes should remain unaffected by a transfer of data from the cache pursuant to the cache hit. The flow proceeds to block 1223 where the system fills in the gaps of the store buffer entry with information from the cache line pursuant to the cache hit to fill the entire data width of the allocated store buffer entry. The flow then proceeds to block 1225 where the storage buffer entry status field is filled with the data size flag indicating the full entry width. The bytestrobe data may also be stored in the data field, but will not be used in the constrained case to indicate the size of the write of the contents from a store buffer entry to the BIU, bus or memory. The flow proceeds to block 1237 where the store buffer 40 retires each entry in the store buffer queue according to the existing data retirement rules for the store buffer.

If a cache lookup is not enabled at block 1211, the flow proceeds to block 1227 where the cache lookup function is disabled. Flow proceeds to decision diamond 1229 where the store buffer control circuitry 42 determines if there is an address match with an existing store buffer entry for gathering the new store request. If no address match, the flow proceeds to block 1231 where the store buffer control 42 allocates a new entry in the store buffer queue 44 for the new store request. If there is a gather address match however, the flow proceeds to block 1233 to gather the current store request to the matched store buffer entry. However, this gathering occurs only if the store requests are contiguous and aligned. Otherwise a new store buffer entry must be allocated.

After either a new store buffer entry is allocated in block 1231 or an address-matched store buffer entry is found for gathering in block 1233, the flow proceeds to block 1235. At block 1235, the storage buffer entry status field is filled with the data size flag indicating contiguous and aligned store requests. The flow then proceeds to block 1237 where the store buffer 40 retires each entry in the store buffer queue according to the existing data retirement rules for the store buffer.

Figure 13:
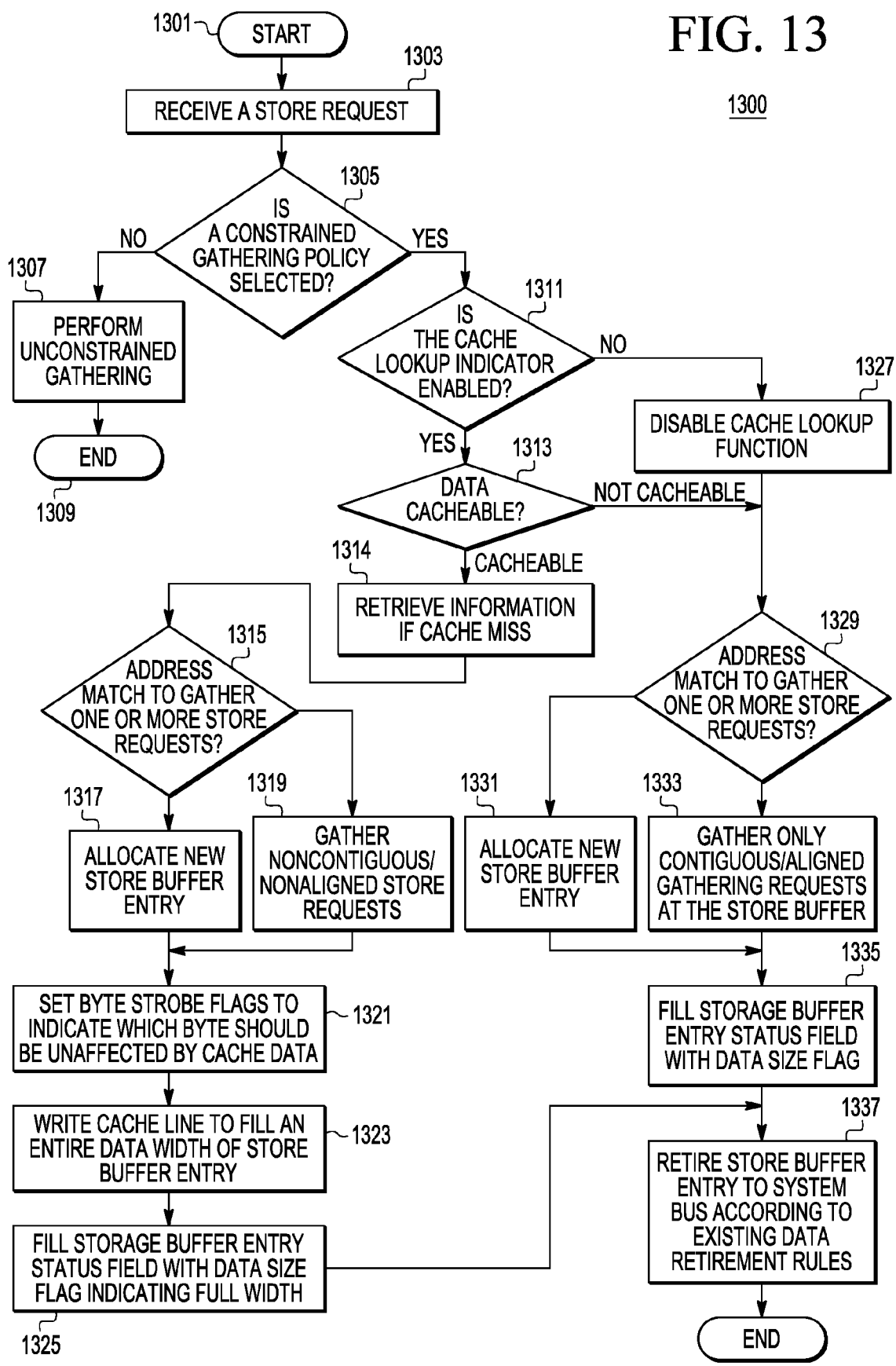
FIG. 13 is a flow diagram of a method of determining whether cache lookup is enabled for data gathering by the data processing device of FIG. 1 in accordance with another embodiment of the present disclosure.

FIG. 13 illustrates, in flow diagram form, operation of buffer circuitry 40 in accordance with another embodiment of the present disclosure that supports use of a cache lookup indicator and use of the table in FIG. 11 to determine the type of gathering to be implemented, if any. Flow 1300 is similar to the flow 1200 of FIG. 12, wherein data flow blocks of FIG. 13 provide similar functions as their corresponding data flow blocks of FIG. 12, except for blocks 1313 and 1314. In particular, at block 1313, it is determined whether the store access is to a cacheable location. If not, flow proceeds to decision diamond 1329, which corresponds to decision diamond 1229 of FIG. 12. Otherwise, if the address is cacheable, flow proceeds to block 1314, where the cacheable data of the store access is retrieved should it not already reside in cache. Thus, if a cache miss occurs to a cacheable location, the data will be retrieved. It will be appreciated that whether or not a cache miss results in the data being retrieved, or results in sparse data being stored at separate entries of the store buffer, can be a user programmable feature. Flow proceeds from block 1314 to block 1315, which corresponds to block 1215 in FIG. 12, and remaining operation of blocks 1317-1337 can proceed in a similar manner as that of blocks 1217-1237 previously described for FIG. 12.

Under certain operating conditions, transfer of a full data width from a store buffer entry may not be necessary, such as described in the above embodiment. Under these circumstances the store buffer control 42 may function to minimize the size of the bus request to the BIU so that the minimum size transfer to the system bus takes place while ensuring all modified data from the store buffer entry is written. The store buffer control may select a container of data to be written that is smaller than the full width request (8 bytes in the described example). The term "container" as used herein with respect to data stored at an entry of a store buffer is intended to mean a contiguous portion of the entry's bits. In many data processing systems 10, this can result in lower power consumption and higher performance. For example, by reducing the container size for the write data transmitted to the system bus, fewer bus lines may be driven thereby saving power. Additionally, the number of bus accesses or amount of time to access a bus may also be reduced.

In a system where a bus bridge to a system bus is narrower than the store buffer width, a minimized container size may take fewer cycles to complete a write transaction. In systems that break up bus write transactions into multiple parts, fewer accesses may occupy the bus if the container size is minimized. The store buffer control 42 may utilize stored strobe values in the store buffer entry along with cache hit indicators to determine how small a container may be to accommodate all modified data.

Whether or not optimization of container size takes place may depend upon user programmable control register values. Limitations on the optimization may also be determined from the user programmable control values. For example, the system may limit how small the container can be (e.g., no less than a half word or a word) to an available set of bus widths. The limitation on optimizing the container size of write data may be helpful in systems where a wider transfer size can actually result in higher performance. Such a system may be one where error correction coding is utilized to protect system RAM. Depending on the granularity of the error correction code word, it may not be advantageous to optimize transfer sizes below certain values for store operations. For example, if 64-bit data granularity is implemented for error correction, then a read-modify write cycle at the system RAM may be avoided for a 64-bit write cycle, while being required for a write access smaller that the ECC granularity of 64-bits. Thus, it may be desirable to disable optimization of the transfer size to below a doubleword for this system RAM. In the example case, no optimization would be employed. However, if error correction data granularity is 32 bits, it may be desirable to limit data transfers optimization to 32-bit and 64-bit transfers, e.g., not allowing smaller than a word (4 bytes) transfer. In that case, a word size (4 bytes) transfer which is less than the width of an entire store buffer entry would be the minimum size, and would be preferred for the cases where the entire modified portion of the store buffer entry is contained within the smaller portion corresponding to an aligned word of data.

Next consider an example case with a set of two halfword (2 byte) store requests to be written to addresses 0 and 2. The writes are smaller than the 8 byte data width of the store buffer entries and can be gathered into a single store buffer entry. In the unconstrained case described above, the external interface will signal an address 0x000000000 and the bytestrobes will be set at 0b11110000. In the constrained case, the address will signal the same, but the data size flag of a word (4 bytes) will be set. Since the gathered data is contiguous and aligned, gathering is available for either unconstrained or constrained cases. The optimized bus transfer size may be selected by the store buffer control to be a word (4 bytes) assuming no user programmed constraints are placed on the optimization. This transfer size may result in fewer cycles to complete on the system bus, especially if a bus bridge to a narrower interface is present in the system.

In a different example, a set of two individual byte stores addressed to addresses 2 and 3 may be gathered. Both store requests may be gathered into a single store buffer entry having an address of 0x00000000, and a set of bytestrobes 0b00110000 for the unconstrained case. In the constrained case, the address set by the external interface to the system bus may be 0x00000002 and the data size flag set at a half word (2 bytes). Note that because the gathered bytes of data are both aligned and contiguous, either constrained or unconstrained gathering is available. In this example, the optimization will select a container size of a halfword for the write transfer unless some user programmed limitation prevents a halfword size. The above system may store the bytestrobes or data size flag and select an optimized container size based on that data in the store buffer entry. In an embodiment, the optimized container size for the eventual transfer of the store buffer entry to the final destination may depend on the destination location in the system. In this case, the optimum container size may vary as a function of the address of the gathered stores in a store buffer entry. For certain address ranges, a minimum size for the optimized transfer could be a word (32-bits), while for other address ranges, the optimum minimum size might be 64-bits. Factors affecting the optimum size include the width of the narrowest portion of the data path to the final destination, which in the case of traversing one or more bus bridges or other conversion logic, may cause conversion of a given data path width to either a narrower or a wider data path width, as well as characteristics of any error coding logic which could require performing read-modify-write access sequences if the data transfer size is reduced to a width smaller than the granularity of ECC encoding. In some cases, it may be more advantageous to proceed with a wider minimum transfer in spite of bridging to a narrower partial pathway to the final destination, if by doing so the cost of the width conversion by the bridge(s) is lower than the savings provided by avoidance of a read-modify-write sequence at the final destination of the write.

FIG. 14 illustrates another embodiment of a storage location 46, specifically a store buffer control register. Similar to the embodiment depicted in FIGS. 3 and 9, the illustrated embodiment is a 32-bit register used for extended store buffer control. Alternatively, the storage location 46 may be a cache control register. Accordingly, the storage location control register 46 may be located in the store buffer 40, as part of cache 50, or elsewhere in data processing device 10. The store buffer control register 46 depicted has a two bit store gather control (STGC) field 48 as described above with respect to FIG. 3. This field holds a store gathering policy indicator also referenced by numeral 48. In addition, the store buffer control register 46 has a single bit store read cache control (STRC) field 49 as described above with respect to FIG. 9. The store read cache control field 49 is used to determine whether the cache read is available to support the store gathering policy selected in accordance with the STGC to be used by the store buffer 40 to gather of multiple store requests into a store buffer entry 44.

The store buffer control register 46 depicted in FIG. 14 also has a two bit store gather write size control (STWSC) field 51. The store gather write size control (STWC) field 51 contains a write size control indicator to indicate whether write size optimization is enabled or disabled and any restrictions placed on the write size optimization, e.g., indicates a set of available data widths that can be written to the system bus. In this example embodiment, the data processing device 10 may be enabled to optimize the write size to be written during a bus write access to BIU 14 and system interconnect 12. The minimum allowable size transfer may be selected to ensure a smallest available bus width is selected that allows all modified data to be written as requested but allowing lower power and better performance for the write access. The store gather write size control indicator 51 is user programmable. In the illustrated embodiment, the store gather write size control indicator 51 can specify whether a write size control enabled or disabled, e.g., value "00" can specify that write size control is disabled and values "01," "10," and "11" can specify that write size control is enabled or partially enabled with restrictions (FIG. 15). This is described further below.

FIG. 15 illustrates a table of field descriptions showing the options for setting the store read cache control indicator and store gathering policy indicator in the STRC and STGC fields 48 and 49 respectively. Additionally, FIG. 15 illustrates the descriptions showing the store gather write size control (STWSC) of the presently described embodiment. The first column shows the designated bits in the store buffer control register 46. Column two illustrates the name assigned to each set of designated bits, STRC, STGC, and STWSC in this embodiment. The third column provides a description of what the designated field of bits reflects. As shown in this embodiment of FIG. 15, the store read cache control indicator indicates whether (e.g., 1—enabled) or not (e.g., 0—not enabled) cache lookups are enabled and, if so, that external write accesses of gathered stores are performed based on the optimized write access width if store gather write size control is enabled and under any constraints set for write size control. Otherwise, the write access may be at full width. The STRC field is set at bit 1 of the store buffer control register 46, but may be stored at any location in the register.

The store gathering policy indicator STGC depicted in FIG. 15 works the same as described above for FIG. 10. The STGC determines whether or not store gathering is enabled at all (e.g., 00—store gathering disabled). The store gathering policy indicator indicates if constraints exist on gathering data information into a store buffer entry (e.g., 10—store gathering enabled, constrained, or 01—store gathering enabled, unconstrained). Constrained gathering requires store requests gathered in a store buffer entry to be aligned and contiguous. However, if STRC cache look up is enabled, a cache hit may permit non-contiguous store requests to be gathered into aligned and contiguous locations of valid data in a store buffer entry when merged with cache data.

The store gathering policy indicator will also indicate whether non-contiguous bytestrobes are asserted and used for write operations of gathered stores to the BIU (e.g., 01—store gathering enabled, unconstrained), or whether size signals are used for write operations of gathered stores to the BIU (e.g., 10—store gathering enabled, constrained). Finally, the setting may be determined based on an address table as discussed above with respect to FIGS. 6 and 7 (e.g., 11—store gathering depends on address). The STGC field is set at bits 2 and 3 of the store buffer control register, but may be stored at any location in the register.

The store gather write size control (STWSC) indicator indicates whether (e.g., 01—enabled, 10—partially enabled, minimum halfword size, 11—partially enabled, minimum word size) or not (00—disabled) write size optimization for bus write accesses is enabled. In the presently described embodiment, the STGC field is selected as constrained to only contiguous gathered bus write accesses (STGC=10). Store read cache control may or may not be enabled. If store gather write control is disabled (00), then all gathered bus write accesses must be full width or doubleword transfers to the BIU 15. When write size optimization for store gathering is enabled without limitation (STWSC=01), gathered bus write access transfers are performed with the minimum size possible but which still ensures that all modified data from the gathered write requests is written as requested to the destination memory address. No restrictions are placed on this minimum size. When write size optimization for store gathering is partially enabled, limitations on the minimum size of transfers to the BIU may be set. For STWSC=10 in the present embodiment, gathered bus write access transfers are minimized, but the minimum size transfer for a bus write access is limited to no less than a halfword size (2 bytes). For STWSC=11 in the present embodiment, the minimum gathered bus write access transfers may be optimized to no less than a word size (4 bytes). The STWSC field is set at bits 4 and 5 of the store buffer control register, but may be stored at any location in the register.

FIG. 16 illustrates another embodiment of the store buffer with store buffer control logic 42 and a store buffer queue 44 having four entries (0-3) in accordance with the example store gathering when store gather write size control (STWSC) may be implemented. The store buffer with store buffer control works similarly to that described in FIG. 11 in the presently described embodiment. Store request data size and store request address information are provided to store buffer control logic 42 as with the embodiment of FIG. 11. Additionally, cache hit information is provided to the control logic 42. Each entry contains a validity flag, a cache hit/full data flag, a status field, address field, and data information field. The store address information and store size information may be used by the control logic 42 to determine the store gathering policy. Alternatively, the store gathering policy can be determined from a store gather control STGC indicator from a control register, such as that described with reference to FIG. 9. Upon determining the store gathering policy to be implemented, the store buffer control circuitry 42 seeks an address match between a received store request and previous store request data stored in a store buffer entry. If an address match is available, the store buffer control logic gathers the new store request data and merges it into the data field of the matched store buffer entry in queue 44. When cache lookup is enabled, non-contiguous store requests may be gathered with a cache hit for the target address. Bytestrobe flags are maintained for the gathered non-contiguous store requests to prevent an overwrite of those data locations when data from the cache is subsequently merged into the store buffer entry upon the cache hit. The bytestrobe flags may also be used the control logic 42 to select the optimized, minimum gathered bus write transfer to the BIU while ensuring all modified data is written. In accordance with the store gather write size control setting, constraints on the minimum bus write access transfer size may exist. In the present embodiment, a data size flag is set indicating the size of the aligned, contiguous data bytes gathered in the entry that are valid and part of the bus write access transfer. The data size flag will indicate that the size of the eventual write operation to BIU 14 via conductor 90.

Figure 17A:
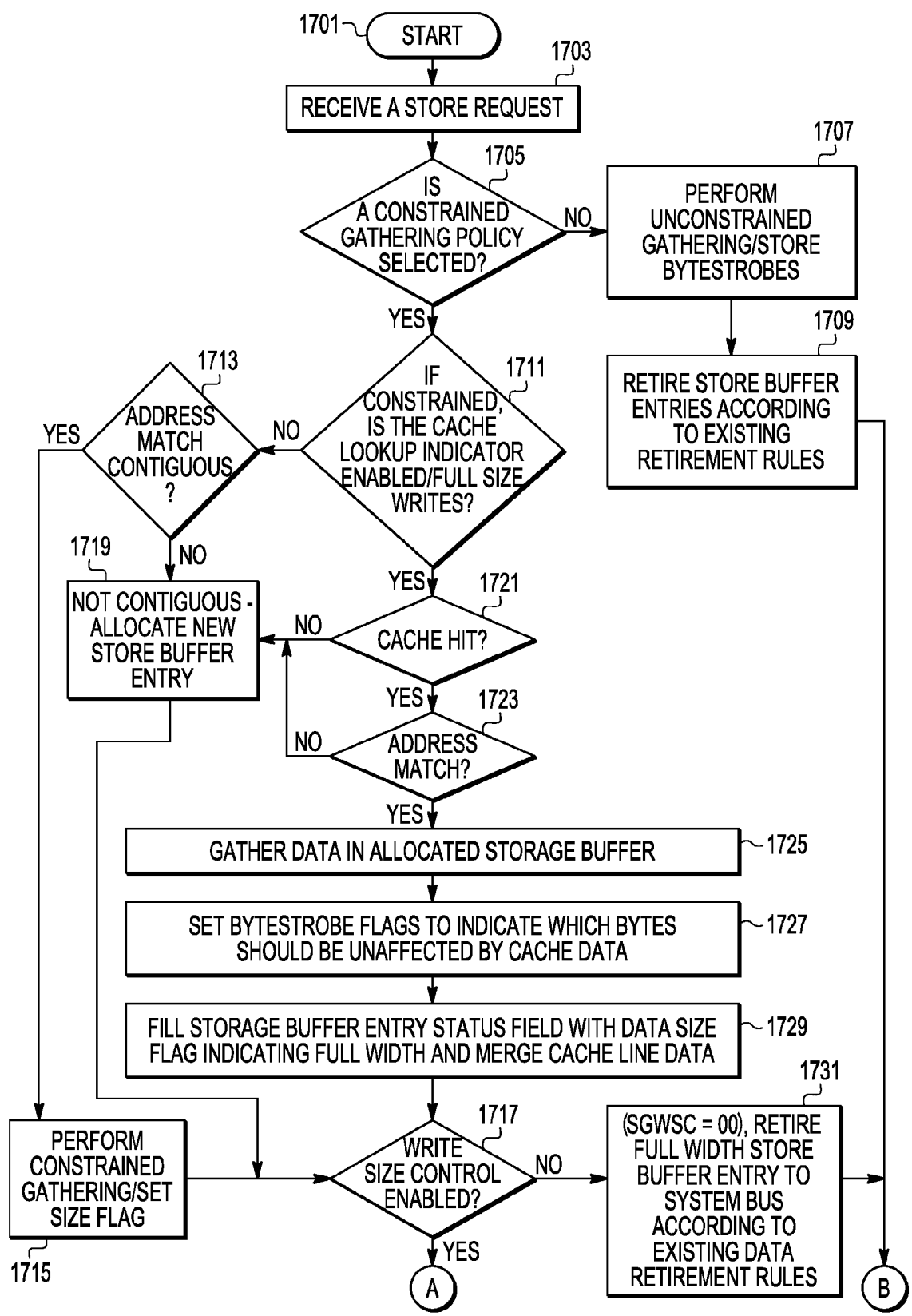
FIGS. 17A and 17B are a flow diagram of a method of implementing write size control for data gathering by the data processing device of FIG. 1 in accordance with another embodiment of the present disclosure.
Figure 17B:
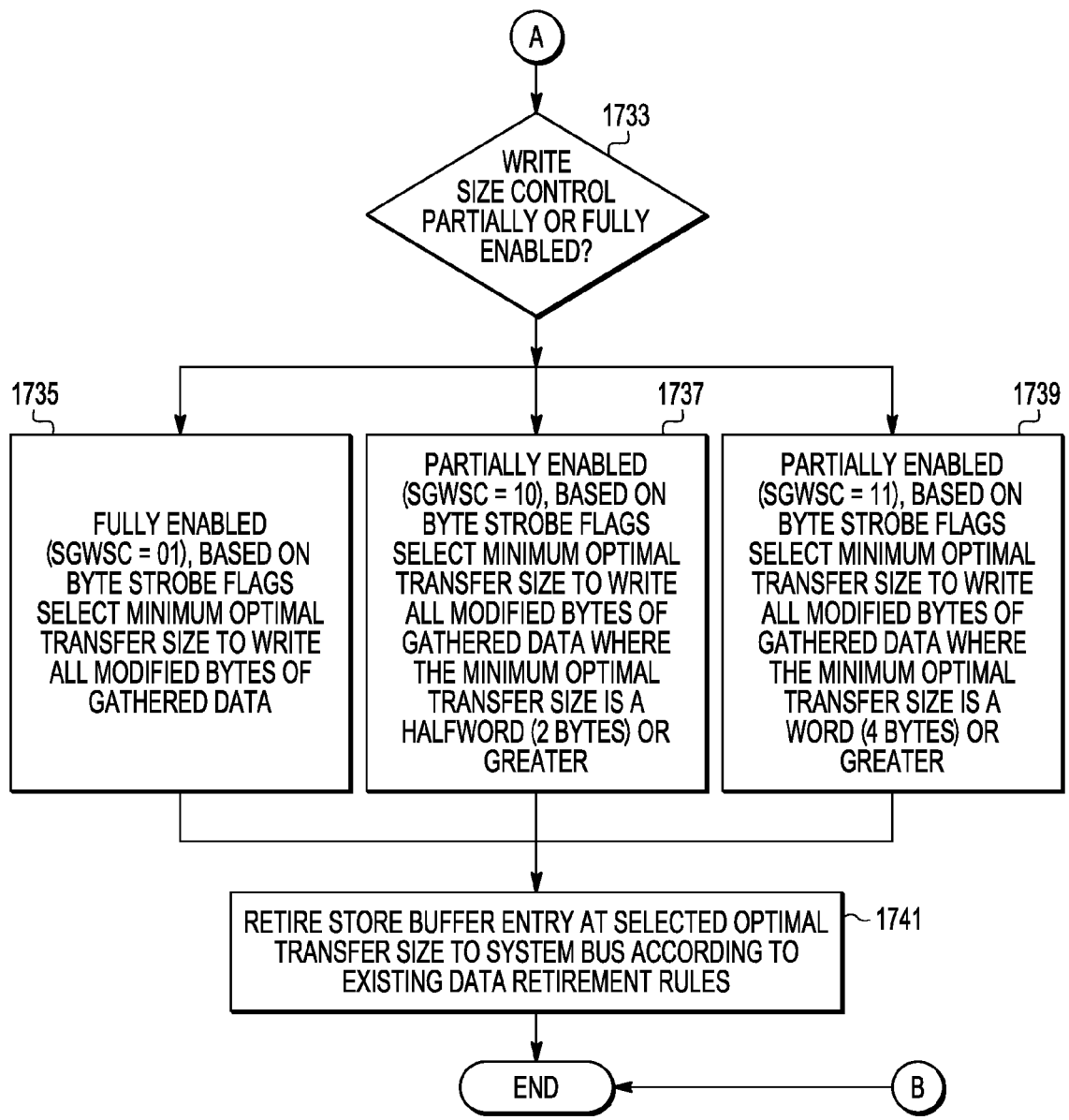

FIG. 17 illustrates, in flow diagram form, operation of buffer circuitry 40 in accordance with one embodiment of the present disclosure that supports use of store gather write size control, store read cache control, and determining the type of gathering to be implemented pursuant to STGC, if any. Flow 1700 begins with start 1701 and proceeds to block 1703 where store buffer 40 receives a new store request (which may also be referred to as a store access request or a store access). This new store request may be received from load/store unit 28, which operates as known in the art, or it may be received from cache 50 which operates as known in the art. Flow proceeds to decision diamond 1705 where the store gathering policy is selected according to the methods and systems described above, for example via a store gathering policy indicator such as STGC in FIG. 16.

If unconstrained store gathering is selected, the flow proceeds to block 1707. Unconstrained gathering is performed and bytestrobe flags are stored with the store buffer entry. Proceeding to block 1709, the unconstrained, gathered data may be retired and the bytestrobe flags are asserted to indicate to memory 13 on the system bus 12 contains modified data.

If constrained store gathering is selected, the flow proceeds to decision diamond 1711 where it is determined if a cache lookup function is enabled. The store buffer control logic 42 determines whether the store read cache control indicator (STRC) is set to enable cache lookups. If no cache lookup is enabled, the flow proceeds to decision diamond 1713 to determine if an address match exists in a store buffer entry and if the new store request is contiguous. Proceeding to block 1715, constrained gathering is performed only if store requests are aligned and contiguous with a store request in an address matched store buffer entry. Proceeding to block 1717, it is determined whether write size control is enabled.

If there is no address match or the store request is not contiguous, a new store buffer entry is allocated at block 1719. The size flag is set for the store buffer entry allocated for the new store request. The flow proceeds to decision diamond 1617 to determine if write size control is enabled.

If a cache lookup is enabled, the flow proceeds to decision diamond 1721 where a cache lookup is performed to determine if there is a cache hit. When there is no cache hit, the flow proceeds to block 1719 where a new store buffer entry must be allocated for the new store request assuming the store request is not contiguous with an address matched store buffer entry. In that case, the flow proceeds to decision diamond 1717 to determine if write size control is enabled.

With a cache hit at decision diamond 1721, the system sets the cache hit flag. When no store gather write size control is enabled, a full size write will be implemented and a full size flag may also be set. The flow proceeds to decision diamond 1723 where the destination target address of the received store request is examined by the store buffer control circuitry 42. The store buffer control circuitry 42 determines if there is an address match to permit gathering at a current store buffer entry containing a previously stored store request. If an address is not found matching the new store request, then the flow proceeds to block 1719 and allocates a new store buffer entry. The flow then proceeds to decision diamond 1717 to determine if write size control is enabled. On the other hand, if a matching address is found, then the flow proceeds to block 1725 where the matching storage buffer entry is allocated for the new store request to be gathered with the previously stored store request. The store requests may be gathered in the store buffer entry, even if the store requests are non-contiguous and not aligned. Proceeding to block 1727, bytestrobe flags are set and stored at the store buffer entry to indicate which bytes are to be unaffected by cache data. Then the cache line data may be merged with the gathered store requests in the allocated store buffer entry and the data size flag is set at full width at block 1729. At that point, the flow proceeds to decision diamond 1717.

After constrained gathering is performed in block 1715, or a new store buffer entry is allocated in block 1719, or an address-matched store buffer entry is found for gathering store requests and merged cache line data in block 1729, the flow proceeds to decision diamond 1717 to determine if store gather write size control is enabled.

If write size control is not enabled (for example SGWSC=00) then the flow proceeds to block 1731. At block 1731, the store buffer entry with one or more store requests will retire as a full width bus write access according to existing retirement rules. Existing retirement rules may include, for example, writing the oldest store buffer entry to the BIU upon allocation of a new store buffer entry.

If write size control is enabled, then a determination is made as to whether write size control is fully or partially enabled at decision diamond 1733. When fully enabled (for example SGWSC=01), at block 1735 the store buffer controller 42 determines the minimum optimal transfer size based on the bytestrobes stored in the store buffer entry. Alternatively, the data size flag for a constrained gather may determine the minimum size transfer needed for the optimum performance and power savings upon a bus write access. The minimum size must accommodate writing all modified bytes of gathered data in the store buffer entry.

When partially enabled (for example SGWSC=10) at block 1737, the optimal minimum size of a bus write access transfer is selected based on the bytestrobe flags, but is subject to a minimum size restriction. In this example, the minimum transfer size may not be less than a halfword (2 bytes). In an alternate embodiment, the size flag may be used to determine the minimum optimal size.

In the current embodiment, another partially enabled write size control option is also available at block 1739 (for example SGWSC=11). Similar to SGWSC=10, the optimal minimum transfer size is determined with restrictions on the smallest transfer size. For SGWSC=11 in the recited embodiment, the smallest transfer size is a word (4 bytes). The limitation on smallest transfer size may be set at any level. The minimum transfer size may be indicated in the user programmable store gather write size control (SGWSC) store field as in the examples above.

Whether partially or fully enabled, the flow proceeds to block 1741 where the store buffer entry may be retired at the selected optimal transfer size. The data is retired to the system bus according to existing data retirement rules for the store buffer.

In an alternate embodiment, the minimum preferred transfer size may vary depending on the address of the final destination of the retirement of the store buffer entry. A lookup table may be employed, which is configured based on the optimal performance characteristics of write retirement to one or more predetermined address ranges in the system. At the time of performing the retirement of the stored data present in the store buffer entry by the BIU, the minimum size transfer is selected as the access size performed by the BIU for that particular store buffer entry retirement. That minimum size transfer is selected depending on whether it meets the constraints of holding all modified data (as indicated by the bytestrobe flag settings) within the individual store buffer entry, and meets the optimization minimums set according to which address range of the predetermined address ranges are targeted by the store of the write buffer contents.

The example embodiments depicted in the flow charts of FIG. 8, FIG. 12, FIG. 13, and FIG. 17 need not proceed in the order shown. In an alternative embodiment for example, determining if cache lookup is enabled could occur before selecting a gathering policy. In fact, other steps disclosed herein may be part of the method and system. In one example embodiment where writing store requests to a system interconnect must be contiguous and aligned, whether to gather store requests may be determined based entirely on whether the store requests are cacheable. If a new store request is not contiguous with an address matched store request already stored in a store buffer entry and the store requests are not cacheable, a cache lookup is unavailable. Thus, the non-contiguous store requests cannot be gathered in the same store buffer entry. A new store buffer entry must be allocated for the new store request.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIGS. 1 and 2 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements. For example, store buffer 40 and cache circuitry 50 in FIG. 1 are depicted as separate logical blocks and cache circuitry 50 is even optional in some embodiments of the present disclosure. However, store buffer 40 and cache circuitry 50 may be implemented in some architectures as a single logical block with shared or overlapping control circuitry.

Also for example, in one embodiment, the illustrated elements of system 10 are circuitry located on a single integrated circuit or within a same device. Alternatively, system 10 may include any number of separate integrated circuits or separate devices interconnected with each other. Also for example, system 10 or portions thereof may be soft or code representations of physical circuitry or of logical representations convertible into physical circuitry. As such, system 10 or portions thereof may be embodied in a hardware description language of any appropriate type. In another embodiment, system 10 is a computer system such as a personal computer system or other type of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
receiving a first store request at a store buffer;
receiving a second store request at the store buffer;
gathering data information from the first and second store requests in a first entry of the store buffer in response to determining that gathered stores are required to be contiguous once gathered; and
optimizing a write transaction size from the store buffer to a system bus based on a container size determined from the gathered data information in the first entry of the store buffer; wherein optimizing includes selecting the write transaction size from a set of available transaction sizes, a user programmable indicator indicating the set of available transaction sizes.

2. The method of claim 1 wherein gathering data information from the first and second store requests in the first entry of the store buffer is in response to a cache hit indicator indicating a cache hit.

3. The method of claim 1 wherein selecting the write transaction size selects a minimum number of contiguous bytes needed for the write transaction that ensures the gathered data information modified pursuant to the first and second store requests is written to the system bus.

4. The method of claim 1 wherein the first and second store requests are non-contiguous store requests.

5. The method of claim 4 wherein optimizing the write transaction size from the store buffer to the system bus comprises selecting a minimum transaction size from the set that is at least equal to the minimum number of contiguous bytes needed for the write transaction to ensure the gathered data information is written to the system bus.

6. The method of claim 1 wherein the container size is determined from stored strobe flags at the first entry of the store buffer.

7. The method of claim 1 wherein optimizing the write transaction size from the store buffer to the system bus is enabled based on a user programmable storage location.

8. A method comprising:
receiving a first store request at a store buffer;
receiving a second store request at the store buffer;
gathering data information of the first and second store requests in a first entry of the store buffer in response to determining a cache hit has occurred for a target address of the first and second store requests; and
optimizing a write transaction size from the store buffer to a system bus based on a container size determined from the gathered data information in the first entry of the store buffer, wherein optimizing includes selecting the write transaction size from a set of available transaction sizes, a user programmable indicator indicating the set of available transaction sizes.

9. The method of claim 8 wherein the selecting the write transaction size selects a minimum number of contiguous bytes needed for the write transaction that ensures the gathered data information modified pursuant to the first and second store requests is written to the system bus.

10. The method of claim 8 wherein the container size is determined from stored strobe flags at the first entry of the store buffer.

11. The method of claim 8 wherein the first and second store requests are non-contiguous store requests.

12. The method of claim 8 wherein optimizing the write transaction size from the store buffer to the system bus comprises selecting a minimum transaction size from the set that is at least equal to the minimum number of contiguous bytes needed for the write transaction to ensure the gathered data information is written to the system bus.

13. The method of claim 12 wherein the minimum size transfer is a halfword.

14. The method of claim 8 wherein optimizing the write transaction size from the store buffer to the system bus is enabled based on a user programmable storage location.

15. A device, comprising:
a data processing core to initiate store requests;
a system bus, coupled to a bus interface unit, to communicate store requests;
a store buffer comprising a store buffer control module to receive a first store request, to receive a second store request, and to gather data information of the first and second store request in a first entry of the store buffer; and
a data cache coupled to the store buffer, wherein the store buffer is to optimizes a write transaction size of a write transaction to the system bus based on a container size determined from the gathered data information in the first entry of the store buffer, wherein optimizing includes selecting the write transaction size from a set of available transaction sizes, a user programmable indicator indicating the set of available transaction sizes.

16. The device of claim 15, wherein selecting the write transaction size selects a minimum number of contiguous bytes needed for the write transaction that ensures the gathered data information modified pursuant to the first and second store requests is written to the system bus.

17. The device of claim 15, wherein in response to a cache hit, the store buffer gathers data information from the first and second store requests wherein the first and second store requests are non-contiguous store requests.

18. The device of claim 15, wherein an external address and the container size is further determined from the stored strobe flags at the first entry of the store buffer.

19. The device of claim 15, wherein available write transaction sizes are indicated by a user programmable indicator.

20. The device of claim 15, wherein the write transaction size optimization from the store buffer to the system bus is enabled based on a user programmable storage location.

* * * * *